United States Patent
Saad et al.

(12) 
(10) Patent No.: US 11,632,325 B2
(45) Date of Patent: Apr. 18, 2023

(54) UTILIZING DOMAIN SEGMENT IDENTIFIERS FOR INTER-DOMAIN SHORTEST PATH SEGMENT ROUTING

(71) Applicant: Juniper Networks, Inc., Sunnyvale, CA (US)

(72) Inventors: Tarek Saad, Ottawa (CA); Jonathan C. Barth, Collegeville, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 176 days.

(21) Appl. No.: 16/825,734

(22) Filed: Mar. 20, 2020

(65) Prior Publication Data

US 2021/0297340 A1 Sep. 23, 2021

(51) Int. Cl.
*H04L 12/28* (2006.01)
*H04L 45/12* (2022.01)
*H04L 12/46* (2006.01)
*H04L 45/02* (2022.01)
*H04L 45/00* (2022.01)
*H04L 45/50* (2022.01)

(52) U.S. Cl.
CPC .......... *H04L 45/12* (2013.01); *H04L 12/4633* (2013.01); *H04L 45/02* (2013.01); *H04L 45/04* (2013.01); *H04L 45/22* (2013.01); *H04L 45/50* (2013.01)

(58) Field of Classification Search
CPC ..... H04L 12/4633; H04L 45/02; H04L 45/04; H04L 45/12; H04L 45/22; H04L 45/34; H04L 45/50
See application file for complete search history.

(56) References Cited

U.S. PATENT DOCUMENTS

| | | | | |
|---|---|---|---|---|
| 9,832,127 B2* | 11/2017 | Akiya | ................ | H04L 45/50 |
| 2011/0205909 A1* | 8/2011 | Cao | ................ | H04L 41/00 |
| | | | | 370/248 |
| 2014/0198634 A1* | 7/2014 | Kumar | ................ | H04L 45/50 |
| | | | | 370/228 |

(Continued)

FOREIGN PATENT DOCUMENTS

CN 109863725 A 6/2019

OTHER PUBLICATIONS

Extended European Search Report for Application No. EP20174426. 5, dated Aug. 18, 2018, 8 pages.

(Continued)

*Primary Examiner* — Phuc H Tran
(74) *Attorney, Agent, or Firm* — Harrity & Harrity, LLP

(57) ABSTRACT

An ingress network device may receive a core domain network segment identifier associated with a core domain network of the multi-domain network. The ingress network device may receive location data of an egress network device associated with a second leaf domain network of the multi-domain network, wherein the location data may include data identifying the core domain network segment identifier, a second leaf domain network segment identifier associated with the second leaf domain network, and an egress network device segment identifier associated with the egress network device. The ingress network device may store the core domain network segment identifier and the location data, and may utilize the core domain segment identifier and the location data to route traffic to the egress network device.

20 Claims, 14 Drawing Sheets

(56) References Cited

U.S. PATENT DOCUMENTS

| | | | |
|---|---|---|---|
| 2015/0009803 A1* | 1/2015 | Bashandy | H04L 41/0668 |
| | | | 370/219 |
| 2015/0030026 A1* | 1/2015 | Kumar | H04L 43/0811 |
| | | | 370/392 |
| 2015/0071286 A1 | 3/2015 | De Silva et al. | |
| 2015/0109902 A1* | 4/2015 | Kumar | H04L 41/0668 |
| | | | 370/219 |
| 2015/0109904 A1* | 4/2015 | Filsfils | H04L 45/34 |
| | | | 370/221 |
| 2017/0230276 A1 | 8/2017 | Ceccarelli et al. | |
| 2018/0109450 A1* | 4/2018 | Filsfils | H04L 45/74 |
| 2018/0198706 A1 | 7/2018 | Ceccarelli et al. | |
| 2018/0278510 A1* | 9/2018 | Iqbal | H04L 45/50 |
| 2019/0068403 A1* | 2/2019 | Lee | H04L 12/4641 |
| 2019/0190818 A1 | 6/2019 | Ceccarelli et al. | |
| 2021/0297340 A1* | 9/2021 | Saad | H04L 45/22 |

OTHER PUBLICATIONS

Filsfils C., et al., "Internet Engineering Task Force (IETF) Segment Routing Architecture", Jul. 2, 2018, 32 pages, XP055718271, [retrieved on Jul. 27, 2020] Retrieved from the Internet [URL: https://tools.ietf.org/pdf/rfc8402.pdf].

Sgambelluri A., et al., "Experimental Demonstration of Multi-domain Segment Routing", European Conference on Optical Communications (ECOC), Sep. 27, 2015, pp. 1-3, XP032820139 [retrieved on Nov. 30, 2015].

Filsfils. C, et al., "Segment Routing Architecture", Jul. 31, 2018, pp. 32.

* cited by examiner

UTILIZING DOMAIN SEGMENT IDENTIFIERS FOR INTER-DOMAIN SHORTEST PATH SEGMENT ROUTING

BACKGROUND

A multi-domain network or a spine and leaf network is a data center network topology that includes leaf networks (e.g., to which ingress network devices and egress network devices connect) and a spine or core network (e.g., to which the leaf networks connect).

SUMMARY

According to some implementations, a method may include receiving, by an ingress network device associated with a first leaf domain network of a multi-domain network, a core domain network segment identifier associated with a core domain network of the multi-domain network. The method may include receiving location data of an egress network device associated with a second leaf domain network of the multi-domain network, wherein the location data may include data identifying the core domain network segment identifier, a second leaf domain network segment identifier associated with the second leaf domain network, and an egress network device segment identifier associated with the egress network device. The method may include storing the core domain network segment identifier and the location data, and utilizing the core domain segment identifier and the location data to route traffic to the egress network device.

According to some implementations, an ingress network device may include one or more memories and one or more processors to receive a core domain network segment identifier associated with a core domain network of a multi-domain network, wherein the multi-domain network may include the core domain network, a first leaf domain network associated with the core domain network and the ingress network device, and a second leaf domain network. The one or more processors may receive location data of an egress network device associated with the second leaf domain network, wherein the location data includes data identifying the core domain network segment identifier, a second leaf domain network segment identifier associated with the second leaf domain network, and an egress network device segment identifier associated with the egress network device. The one or more processors may store the core domain network segment identifier and the location data, and may utilize the core domain segment identifier, the second leaf domain network segment identifier, and the egress network device segment identifier to route traffic to the egress network device.

According to some implementations, a non-transitory computer-readable medium may store one or more instructions that, when executed by one or more processors of an ingress network device, may cause the one or more processors to receive a core domain network segment identifier associated with a core domain network of a multi-domain network, wherein the ingress network device may be associated with a first leaf domain network of the multi-domain network. The one or more instructions may cause the one or more processors to receive location data of an egress network device associated with a second leaf domain network of the multi-domain network, wherein the location data may include data identifying the core domain network segment identifier, a second leaf domain network segment identifier associated with the second leaf domain network, and an egress network device segment identifier associated with the egress network device. The one or more instructions may cause the one or more processors to store the core domain network segment identifier and the location data, and receive traffic destined for the egress network device. The one or more instructions may cause the one or more processors to determine a path for the traffic, through the multi-domain network and to the egress network device, based on the core domain network segment identifier and the location data, and cause the traffic to be provided to the egress network device via the path.

DETAILED DESCRIPTION

Figure 1A:
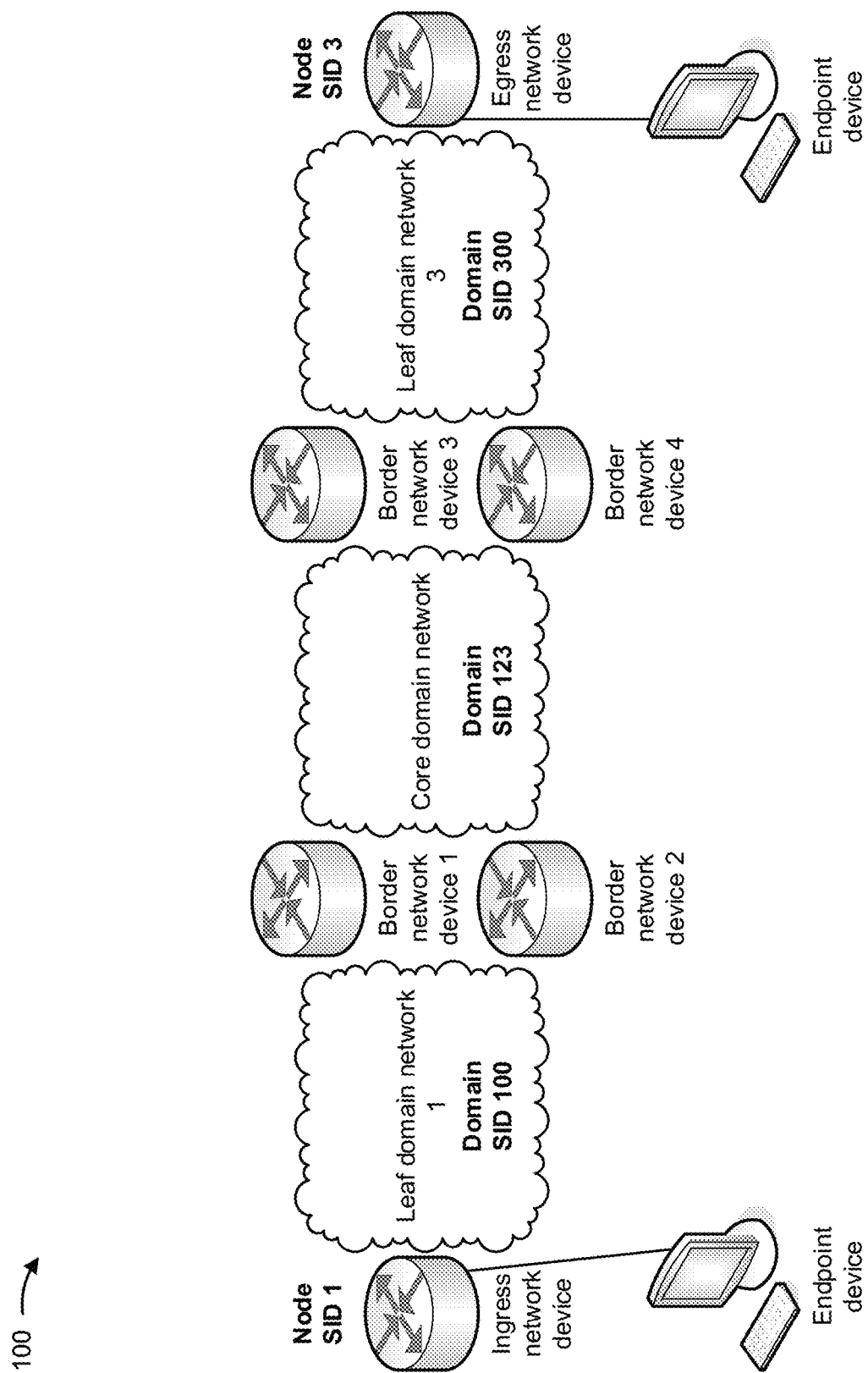
FIGS. 1A-1H are diagrams of one or more example implementations described herein.

The following detailed description of example implementations refers to the accompanying drawings. The same reference numbers in different drawings may identify the same or similar elements.

Multi-domain networks are increasingly being built where a domain or network boundary may include autonomous system border network devices (e.g., autonomous system border routers or ASBRs), area border network devices (e.g., area border routers or ABRs), level 1/2 intermediate systems (e.g., L1/2 IS), multi-instance interior gateway protocol (IGP) border network devices (e.g., border Nodes or BNs), and/or the like. The multi-domain networks are a result of several different networking trends, such as the introduction of merchant-based platforms with very limited routing information base (RIB) and forwarding information base (FIB) resources, the scaling-out of large chassis or multi-chassis systems into many small systems that results in an exponential increase in a total quantity of network devices, the expansion of existing networks from regional networks to national networks and/or international networks, and/or the like.

Inter-domain multiprotocol label switching (MPLS) presents few practical inter-domain challenges for smaller networks. However, for a very large network (e.g., a multi-domain network) with many network devices, MPLS is unable to provide end-to-end or any-to-any reachability while also minimizing an amount of detailed state information that is proliferated across domain boundaries. Traditionally, MPLS requires both labels and Internet protocol (IP) host addresses to be propagated from end-to-end to achieve connectivity. This is no longer possible due to the size and capabilities of the multi-domain networks. Thus, current techniques for deploying multi-domain networks waste computing resources (e.g., processing resources, memory resources, communication resources, and/or the like), networking resources, and/or the like associated with transmitting detailed state information throughout a multi-domain network, maintaining state information associated with the multi-domain network, attempting to provide end-to-end or any-to-any reachability for the multi-domain network, and/or the like.

Some implementations described herein provide a network device (e.g., an ingress network device) that utilizes domain segment identifiers for inter-domain shortest path segment routing. For example, an ingress network device associated with a first leaf domain network of a multi-domain network may receive a core domain network segment identifier associated with a core domain network of the multi-domain network. The ingress network device may receive location data of an egress network device associated with a second leaf domain network of the multi-domain network, where the location data may include data identifying the core domain network segment identifier, a second leaf domain network segment identifier associated with the second leaf domain network, and an egress network device segment identifier associated with the egress network device. The ingress network device may store the core domain network segment identifier and the location data, and may utilize the core domain segment identifier and the location data to route traffic to the egress network device.

In this way, the network device may utilize domain segment identifiers for inter-domain shortest path segment routing. Deploying segment routing in a multi-domain network may include deployment of segment routing global values, per network device label indexes for network device and domain segment identifiers, and/or the like. This may minimize propagation of detailed routing state information across domain boundaries. This, in turn, conserves computing resources (e.g., processing resources, memory resources, communication resources, and/or the like), networking resources, and/or the like that would otherwise have been used in transmitting detailed state information throughout a multi-domain network, maintaining state information associated with the multi-domain network, attempting to provide end-to-end or any-to-any reachability for the multi-domain network, and/or the like.

FIGS. 1A-1H are diagrams of one or more example implementations 100 described herein. As shown in FIGS. 1A-1H, one or more endpoint devices may communicate and exchange traffic with a multi-domain network. The multi-domain network may include one or more leaf domain networks (e.g., leaf domain network 1 and leaf domain network 3), a core domain network, one or more border network devices (e.g., border network devices 1-4) between the leaf domains and the core domain network, an ingress network device connected to a leaf domain (e.g., leaf domain network 1) that may communicate with an endpoint device (e.g., a source endpoint device), and an egress network device connected to a leaf domain (e.g., leaf domain network 3) that may communicate with an endpoint device (e.g., a destination endpoint device). The network devices and domains shown in FIGS. 1A-1H are provided merely as examples of network devices and domains, and, in practice, the multi-domain network may include additional network devices and/or additional domains.

As shown in FIG. 1A, the core domain network may be a gateway to all other domain networks included in the multi-domain network. The core domain network may be associated with one or more leaf domain networks. The leaf domain network may be a domain network that is associated with one or more ingress network devices and/or one or more egress network devices. The ingress network device and/or the egress network device may be a device (e.g., a router, a server, an edge device, and/or the like) that is configured to communicate with one or more endpoint devices. In some implementations, a network device may be configured to be both an ingress network device and an egress network device. As such, a single network device may be capable of performing functions described herein with respect to an ingress network device and an egress network device.

Traffic may be exchanged through the multi-domain network from the ingress network device to the egress network device. For example, the ingress network device may transmit traffic to one or more border network devices (e.g., border network device 1 and/or border network device 2) via leaf domain network 1. The one or more border network devices (e.g., border network device 1 and/or border network device 2) may transmit the traffic to the core domain network (e.g., the gateway to all other domain networks in the multi-domain network). The traffic may be transmitted through the core domain network to the appropriate leaf domain network (e.g., leaf domain network 3) via one or more additional border network devices (e.g., border network device 3 and/or border network device 4). The one or more additional border network devices (e.g., border network device 3 and/or border network device 4) may transmit the traffic through the leaf domain network (e.g., leaf domain network 3) to the egress network device. The egress network device may then forward the traffic to the appropriate endpoint device.

The border network device may be an autonomous system border router (ASBR), an area border network device (e.g., an area border router or ABR), a level 1/2 intermediate system (e.g., L1/2 IS), a multi-instance interior gateway protocol (IGP) border network device (e.g., a Border Node or BN), and/or the like. Each border network device may be associated with one or more network domains. For example, border network device 1 may be associated with leaf domain network 1 and the core domain network. Border network device 4 may be associated with leaf domain network 3 and the core domain network. In some implementations, the border network device may be associated with more than 2 domain networks.

As further shown in FIG. 1A, the ingress network device, the egress network device and each domain may be associated with a segment identifier (SID). The ingress network device and the egress network device may be associated with a node SID. The node SID associated with the ingress network device and node SID associated with the egress network device may identify the ingress network device and the egress network device. For example, the ingress network device may be identified by node SID 1. The egress network device may be identified by node SID 3. In some implementations, the border network devices may be associated with a node SID.

Each domain of the multi-domain network may be associated with a domain SID. The domain SID may identify the domain associated with the domain SID. The domain SID may also identify the type of domain (e.g., leaf domain, core domain, and/or the like) associated with the domain. The domain SID may be an anycast-SID, such that each device within the domain will be associated with the domain SID. For example, leaf domain network 1 may be identified by domain SID 100. The core domain network may be identified by domain SID 123. Leaf domain network 3 may be identified by domain SID 300.

Figure 1B:
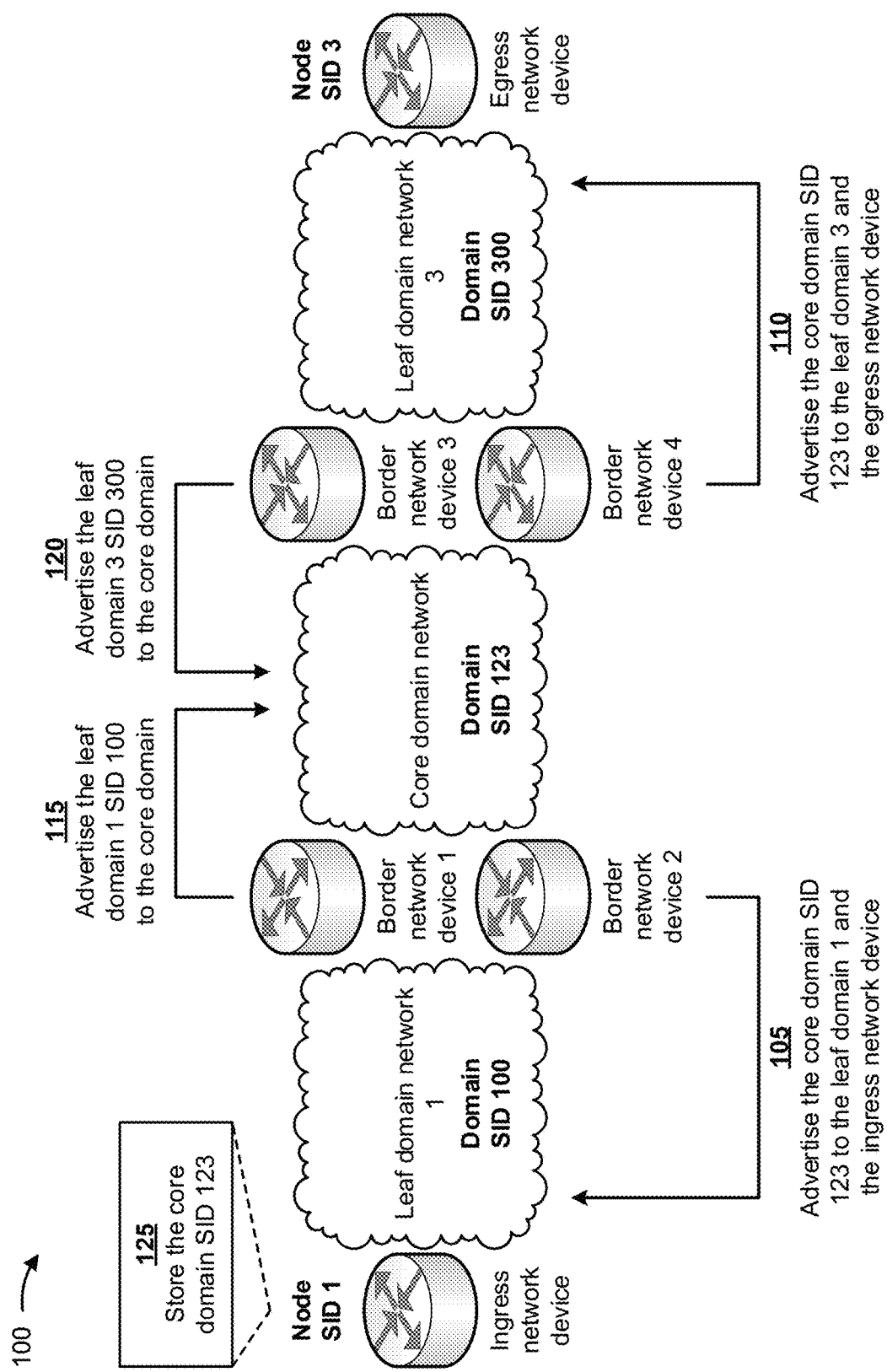

As shown in FIG. 1B, each border network device may advertise (e.g., broadcast, transmit, and/or the like) each domain network that the border network device is associated with. For example, as shown by reference number 105, border network device 1 and/or border network device 2 may advertise the core domain SID 123 to leaf domain network 1 and the ingress network device. In this way, leaf domain network 1 and the ingress network device may identify the core domain network (via domain SID 123). Additionally, leaf domain network 1 and the ingress network device may identify that border network device 1 and/or border network device 2 are associated with the core domain network.

As shown by reference number 110, border network device 3 and/or border network device 4 may advertise the core domain SID 123 to leaf domain network 3 and the egress network device. In this way, leaf domain network 3 and the egress network device may identify the core domain network (via domain SID 123). Additionally, leaf domain network 3 and the egress network device may identify that border network device 3 and/or border network device 4 are associated with the core domain network.

As further shown in FIG. 1B, and by reference number 115, border network device 1 and/or border network device 2 may advertise leaf domain network 1 domain SID 100 to the core domain network. In this way, the core domain network may identify leaf domain network 1 (via domain SID 100). Additionally, the core domain network may identify that border network device 1 and/or border network device 2 are associated with leaf domain network 1.

As shown by reference number 120, border network device 3 and/or border network device 4 may advertise leaf domain network 3 domain SID 300 to the core domain network. In this way, the core domain network may identify leaf domain network 3 (via domain SID 300). Additionally, the core domain network may identify that border network device 3 and/or border network device 4 are associated with leaf domain network 3.

Based on the advertising of domain SIDs, each domain network in the multi-domain network may know other domains in the multi-domain network and the border network device(s) associated with the other domains in the multi-domain network. For example, the core domain network may identify that traffic is intended for leaf domain network 3. The core domain may identify leaf domain network 3 based on the domain SID of domain SID 300. The core domain may identify that for traffic to reach leaf domain network 3, the traffic may pass through border network device 3 or border network device 4. Similarly, leaf domain network 1 and/or leaf domain network 3 may identify the core domain network and identify the one or more border network devices associated with the core domain network.

The ingress network device and/or the egress network device may know the domain network that the ingress network device and/or the egress network device is associated with (e.g., the ingress network device knows that the ingress network device is associated with leaf domain network 1 and the egress network device knows that the egress network device is associated with leaf domain network 3). The ingress network device and/or the egress network device may know, based on the advertisements described above, that the ingress network device and/or the egress network device is attached to the core domain network (and may identify the core domain network by the core domain SID 123). The ingress network device and/or the egress network device may know how the ingress network device and/or the egress network device is attached to the core domain network (e.g., the egress network device may know that the egress network device is attached to the core domain network via leaf domain network 3 and border network device 3 or border network device 4).

As the border network devices only advertise the domain SIDs of domain networks that are associated with the border network devices (or domain SIDs received by the border network devices) the border network devices do not need to transmit the full forwarding state information (e.g., information identifying the location of one or more ingress network devices and/or one or more egress network devices and how to reach the one or more ingress network devices and/or the one or more egress network devices) associated with the multi-domain network. In this way, the border network devices may conserve computing resources and/or network resources that would have otherwise been used to store and/or transmit the full forwarding state information associated with the multi-domain network.

As further shown in FIG. 1B, and by reference number 125, the ingress network device and/or the egress network device may store the core domain SID 123, identifying the core domain network. The ingress network device and/or the egress network device may store the core domain SID 123 in the ingress network device and/or the egress network device, respectively.

Additionally, or alternatively, the ingress network device and/or the egress network device may store the core domain SID 123 in the leaf domain network associated with the ingress network device and/or the egress network device. In some implementations, the ingress network device and/or the egress network device may store the core domain SID 123 in a device (e.g., a server device, a cloud computing platform, a storage device, and/or the like) associated with the ingress network device and/or the egress network device, respectively.

Figure 1C:
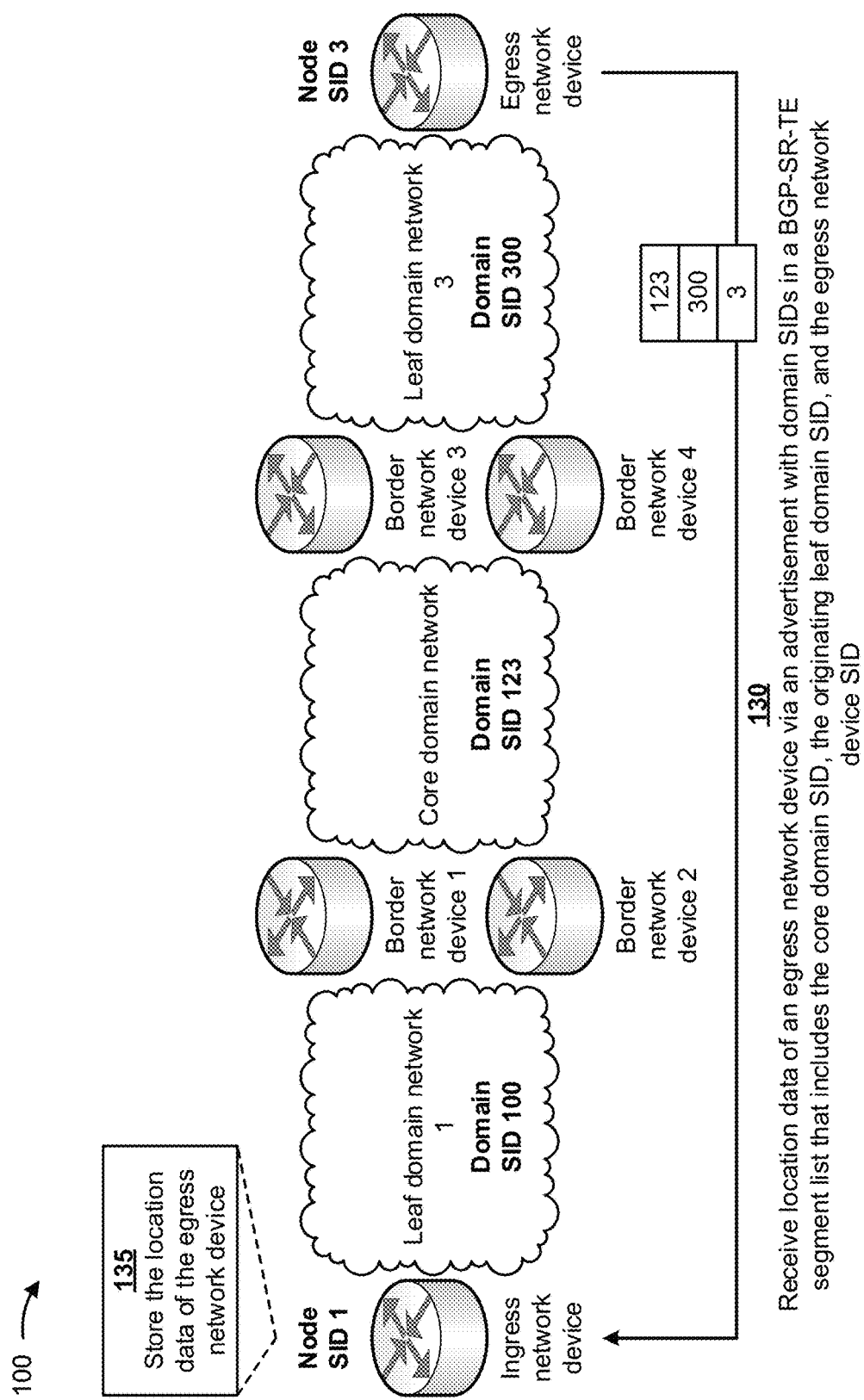

As shown in FIG. 1C, the egress network device may advertise, using a broadcast protocol (such as a border gateway protocol (BGP) and/or the like) and to one or more (or all) ingress network devices in the multi-domain network, location data associated with the egress network device. The location data may identify a location of the egress network device within the multi-domain network and how the egress network device is connected to the core domain network. The egress network device may advertise the location data using the domain SIDs in a BGP segment routing traffic engineering (BGP-SR-TE) segment list.

The BGP-SR-TE segment list may include one or more segments, such as an end point (e.g., the end point associated with the BGP-SR-TE, identified by an IP address), a distinguisher, a color, and/or the like. The egress network device may initiate the advertisement of a BGP-SR-TE segment list that includes an egress network device location segment identifying the location of the egress network device within the multi-domain network and how the egress network device is connected to the core domain network using the domain SIDs. For example, the egress network device location segment may include a core domain SID (e.g., 123), an originating leaf domain SID (e.g., the domain SID identifying the leaf domain network that the egress network device is included in, in this example the domain SID would be 300), and an egress network device SID (e.g., the node SID associated with the egress network device, in this example the node SID would be 3). The core domain SID, the originating leaf domain SID, and the egress network device SID may be identified in the egress network device location segment in a label stack (e.g., 123; 300; 3).

The egress network device may advertise the BGP-SR-TE segment list using a route reflector, such as a centralized route reflector associated with the multi-domain network. Additionally, or alternatively, the egress network device may advertise the BGP-SR-TE segment list through the multi-domain network with each network device adding to the egress network device location segment. For example, the egress network device may advertise the BGP-SR-segment list with the egress network device location segment including only the egress network device SID (e.g., 3). The BGP-SR-TE segment list may be received by the border network device 3 and/or the border network device 4. The border network device 3 and/or the border network device 4 may add to the egress network device location segment by adding the domain SID identifying the originating leaf domain network (e.g., 300). The border network device 3 and/or the border network device 4 may advertise the BGP-SR-TE segment list to the border network device 1 and/or the border network device 2. The border network device 1 and/or the border network device 2 may add to the egress network device location segment by adding the domain SID identifying the core domain network (e.g., 123). The border network device 1 and/or the border network device 2 may advertise the BGP-SR-TE segment list (including the egress network device location segment identifying the core domain SID, the originating leaf domain SID, and the egress network device SID) to the ingress network device.

As further shown in FIG. 1C, and by reference number 130, the ingress network device may receive the location data of the egress network device via an advertisement of the BGP-SR-TE segment list that includes the egress network device location segment. The ingress network device may receive the location data identified in the BGP-SR-TE segment list from the egress network device via the centralized route reflector associated with the multi-domain network. Additionally, or alternatively, the ingress network device may receive the location data identified in the BGP-SR-TE segment list from the border network device 1 and/or the border network device 2, as described above.

In some implementations, the ingress network device may receive a tunnel encapsulation attribute from the egress network device. The tunnel encapsulation attribute may be received as part of the BGP-SR-TE segment list, along with the BGP-SR-TE segment list, or in a separate transmission from the transmission that sends the BGP-SR-TE segment list from the egress network device. The tunnel encapsulation attribute may include a packet that includes a type-length-value (TLV) field. The TLV field may identify information corresponding to a particular encapsulated tunnel type (e.g., an IP tunnel, a user datagram protocol (UDP) tunnel, and/or the like). The TLV field may identify the encapsulated tunnel type, an endpoint address (e.g., an address associated with the egress network device), and/or the like. In some implementations, the TLV field may identify the location data associated with the egress network device. In some implementations the tunnel encapsulation attribute may be used to create an encapsulated tunnel between the ingress network device and the egress network device for the transmission of the location data associated with the egress network device.

As shown by reference number 135, the ingress network device may store the location data of the egress network device. The ingress network device may store the BGP-SR-TE segment list. The ingress network device may analyze the BGP-SR-TE segment list to identify the egress network device location segment. The ingress network device may store the egress network device location segment. In some implementations, the ingress network device may store the location data of the egress network device in the ingress network device, in the leaf domain network associated with the ingress network device (e.g., leaf domain network 1), and/or in a device associated with the ingress network device. In this way, the ingress network device and/or the egress network device may conserve computing resources and/or network resources that would have otherwise been used to store forwarding state information (e.g., information identifying the location of the ingress network device and/or the egress network device and how to reach the ingress network device and/or the egress network device from the core domain network, such as the location data) in the ingress network device and/or in the egress network device.

The ingress network device may store the location data of the egress network device in a data structure (e.g., a list, a table, a mapping, and/or the like). The data structure may include location data associated with one or more (or all) of the egress network devices included in the multi-domain network. The location data may be stored by the ingress network device in the data structure such that the location data of a particular egress network device may be identified in the data structure based on the node SID associated with the particular egress network device. In this way, the ingress network device may conserve computing resources and/or network resources that would have otherwise been used locating, identifying, and/or analyzing location data to identify the location of a particular egress network device within the multi-domain network.

Figure 1D:
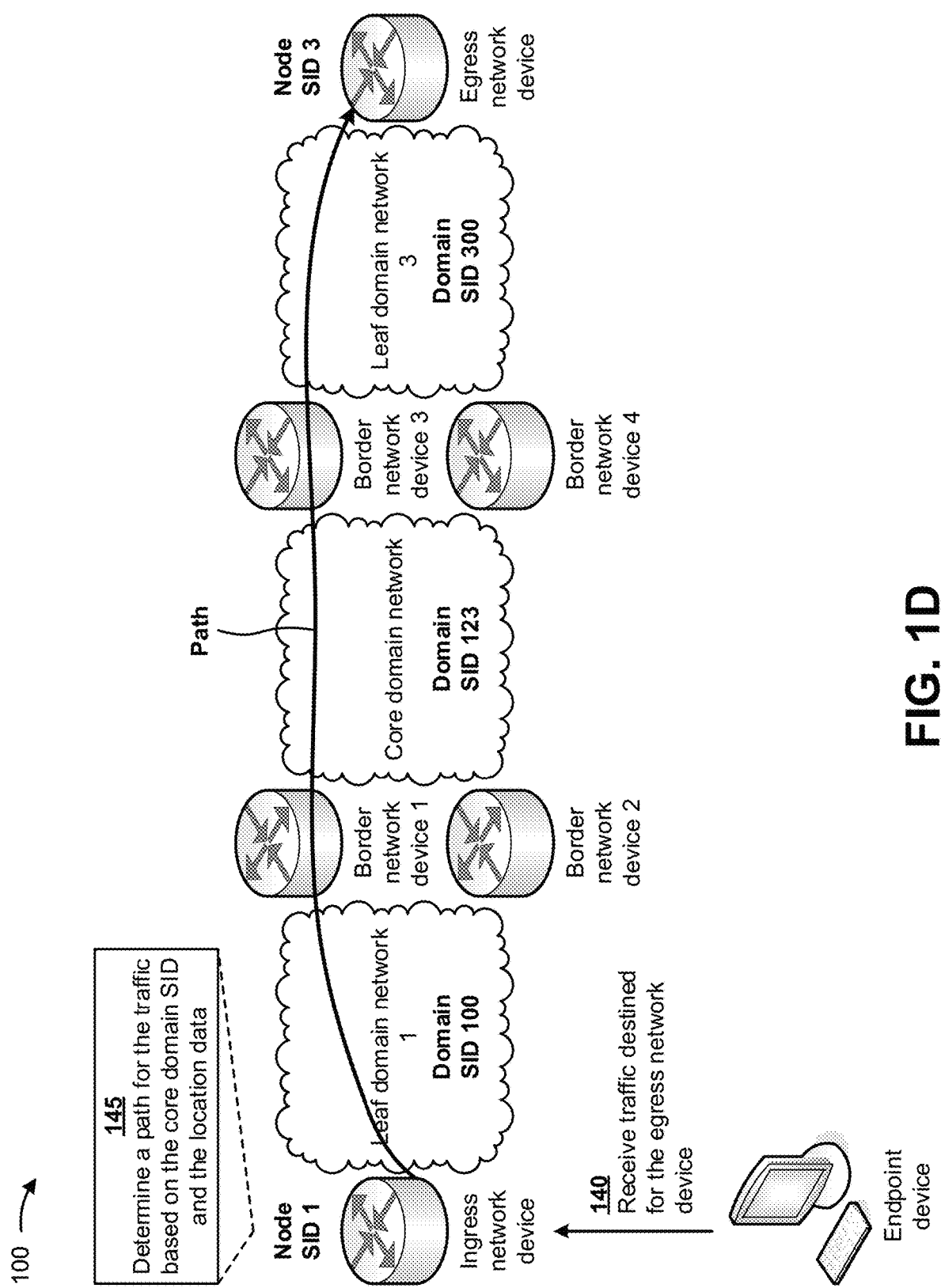

As shown in FIG. 1D, and by reference number 140, the ingress network device may receive traffic destined for the egress network device from an endpoint device. The ingress network device may determine that the traffic is destined for the egress network device by analyzing the traffic to identify an identifier associate with the egress network device (e.g., an IP address, a node SID, and/or the like). For example, the ingress network device may determine that the traffic is destined for the egress network device by analyzing a header associated with the traffic.

As shown by reference number 145, the ingress network device may determine a path for the traffic to the egress network device through the multi-domain network based on the core domain SID and the location data associated with the egress network device. The ingress network device may identify that the traffic is destined for the egress network device and may determine the location data associated with the egress network device, such as by accessing the data structure and searching the data structure based on the node SID associated with the egress network device to identify the location data associated with the egress network device.

The ingress network device may determine a path to the core domain network based on the core domain SID and the advertisement received from the border network device 1 and/or the border network device 2. For example, the ingress network device may know that the ingress network device can reach the core domain network via the border network device 1 and/or the border network device 2. The ingress network device may determine the path to the core domain network by routing the traffic to the border network device 1 and/or the border network device 2 (e.g., as shown in FIG. 1C, the path goes through the border network device 1).

The ingress network device may determine a path from the core domain network to the egress network device based on the location data associated with the egress network device. The location data associated with the egress network device may identify how to reach the egress network device based on the core domain SID, the originating leaf domain SID, and the node SID associated with the egress network device. For example, the ingress network device may determine that the location data associated with the egress network device identifies the core domain SID of 123

(identifying the core domain network), the originating leaf domain SID of 300 (identifying leaf domain network 3), and the node SID of 3 (identifying the egress network device). Based on the advertisements received by the core domain network from the border network device 3 and/or the border network device 4, the core domain network may identify that the border network device 3 and/or the border network device 4 may be used to reach leaf domain network 3 from the core domain network. As such, the ingress network device may determine that the path from the core domain network should go through the border network device 3 and/or the border network device 4 (e.g., as shown in FIG. 1D, the path goes through the border network device 3). The ingress network device may determine that the path should continue from the border network device 3 and/or the border network device 4 through the leaf domain network 3 to the egress network device.

In some implementations, the ingress network device may determine one or more paths to reach the egress network device based on the core domain SID and the location data associated with the egress network device. In some implementations, the ingress network device may utilize a shortest path first technique to determine the one or more paths to reach the egress network device. The ingress network device may select a path from the one or more paths to reach the egress network device based on a candidate path preference parameter. The candidate path preference parameter may be a cost associated with a path, a delay associated with a path, a preference of a path identified in information received from the egress network device, and/or the like. In some implementations, the one or more paths to reach the egress network device includes one or more shortest label-switched paths through the multi-domain network determined based on the shortest path first technique.

In some implementations, the ingress network device may determine a path (e.g., utilizing a shortest path first technique) through the leaf domain network associated with the ingress network device to a network device (e.g., a border network device) associated with the leaf domain network. The ingress network device may identify the location data (e.g., one or more domain SIDs and/or one or more node SIDs) associated with the destination for the traffic (e.g., the egress network device) to the network device (e.g., a border network device) associated with the leaf domain network. The network device (e.g., a border network device) associated with the leaf domain network may determine a path through a second domain network (e.g., the core domain network, another leaf domain network, an aggregation domain network, and/or the like) associated with the network device to a second network device associated with the second domain network, based on the location data. The path to the egress network device may be determined in this manner (e.g., determined by one or more network devices) until the traffic reaches the egress network device.

Figure 1E:
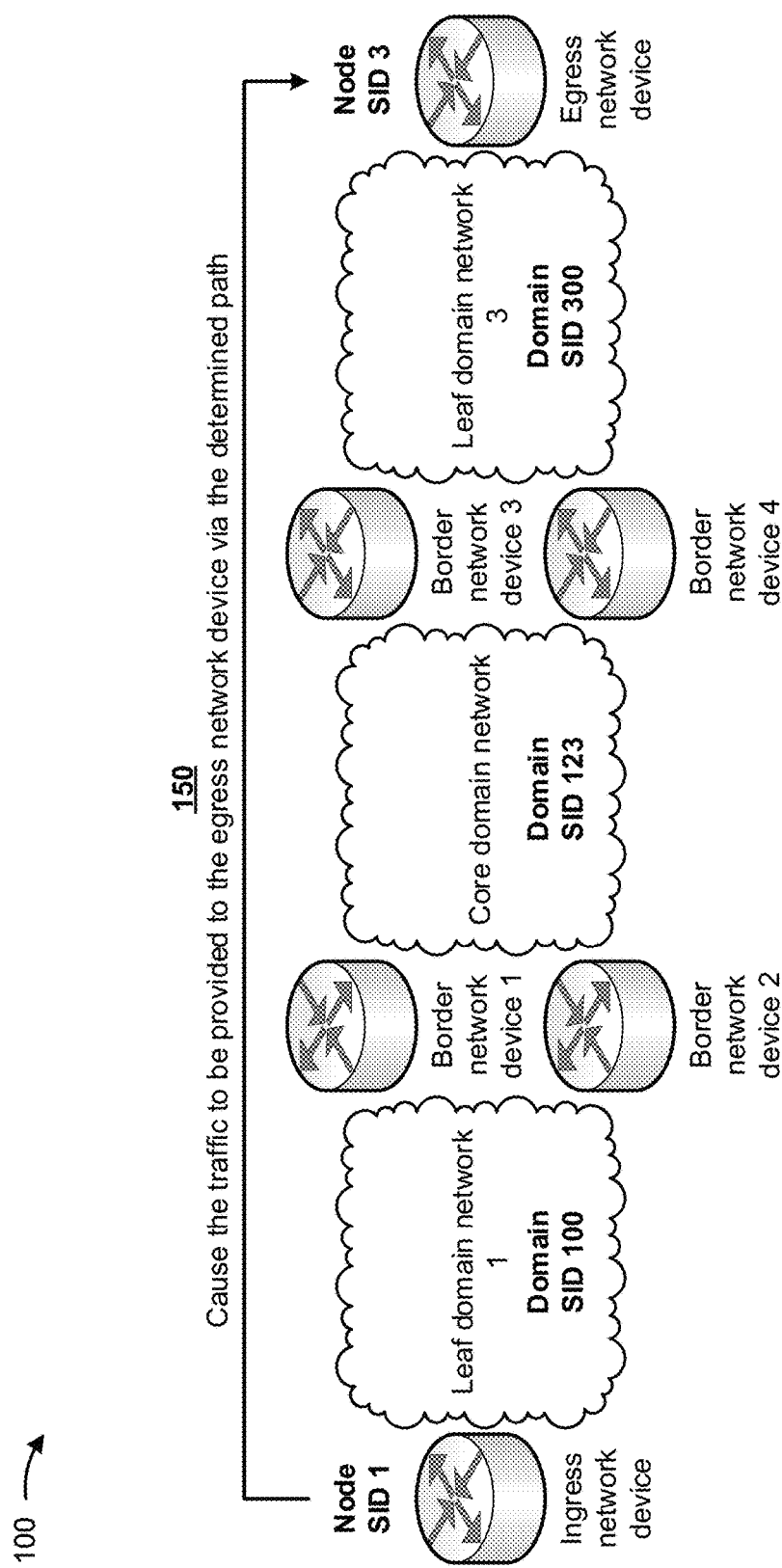

As shown in FIG. 1E, and by reference number 150, the ingress network device may cause the traffic to be provided to the egress network device via the determined path. For example, the ingress network device may cause the traffic to be provided to the egress network device by causing the traffic to be routed through one or more domain networks and one or more border network devices to the egress network device. In some implementations, the ingress network device may cause the traffic to be provided to the egress network device via an encapsulated tunnel, based on the tunnel encapsulation attribute received by the ingress network device. In some implementations, the ingress network device may cause the traffic to be provided to the egress network device via a shortest path, as determined by the ingress network device.

The egress network device may receive the traffic. The egress network device may analyze the traffic to determine an endpoint device associated with the traffic. The egress network device may cause the traffic to be provided to the endpoint device associated with the traffic. For example, the egress network device may analyze the traffic to identify an address (e.g., an IP address and/or the like) of an endpoint device that the traffic is being sent to. The egress network device may transmit the traffic to the endpoint device associated with the traffic.

Figure 1F:
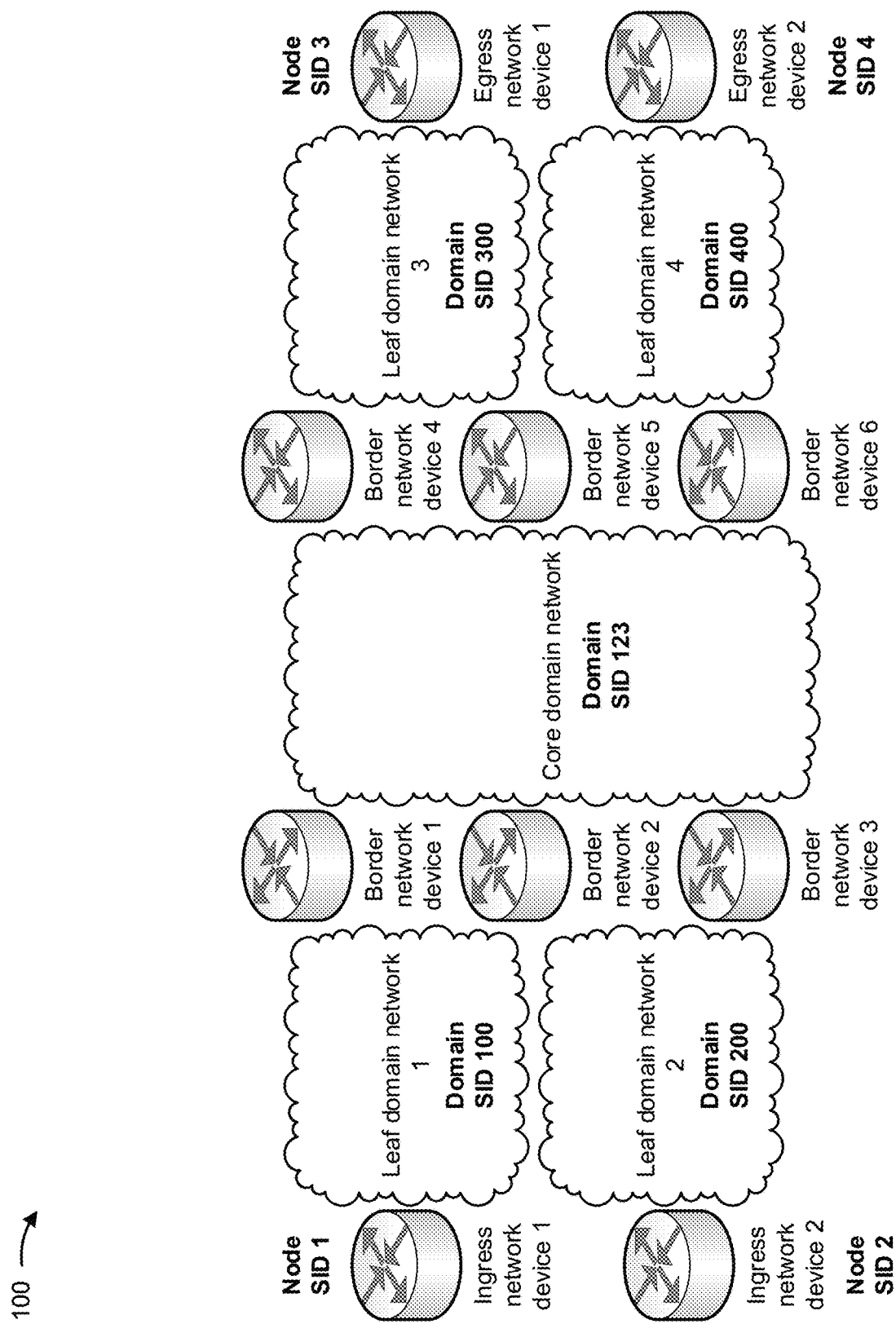
Figure 1G:
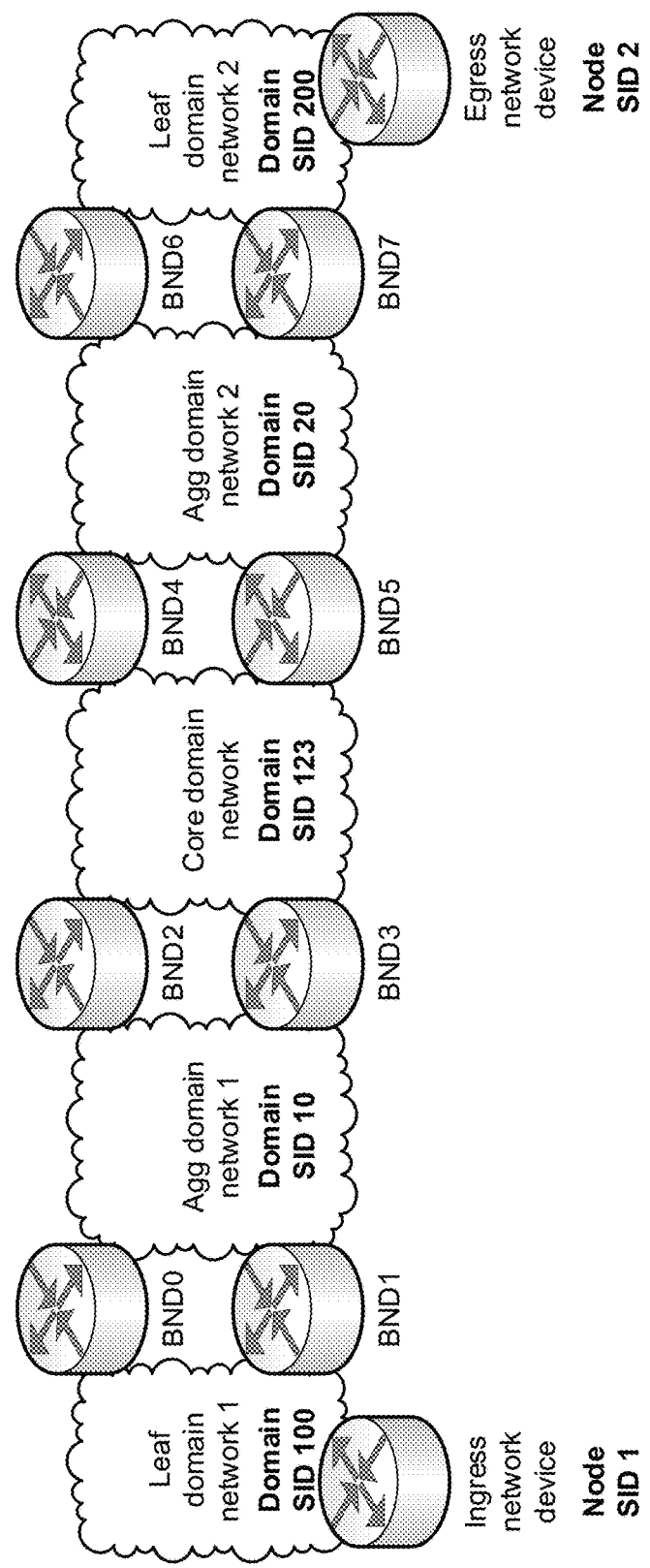
Figure 1H:
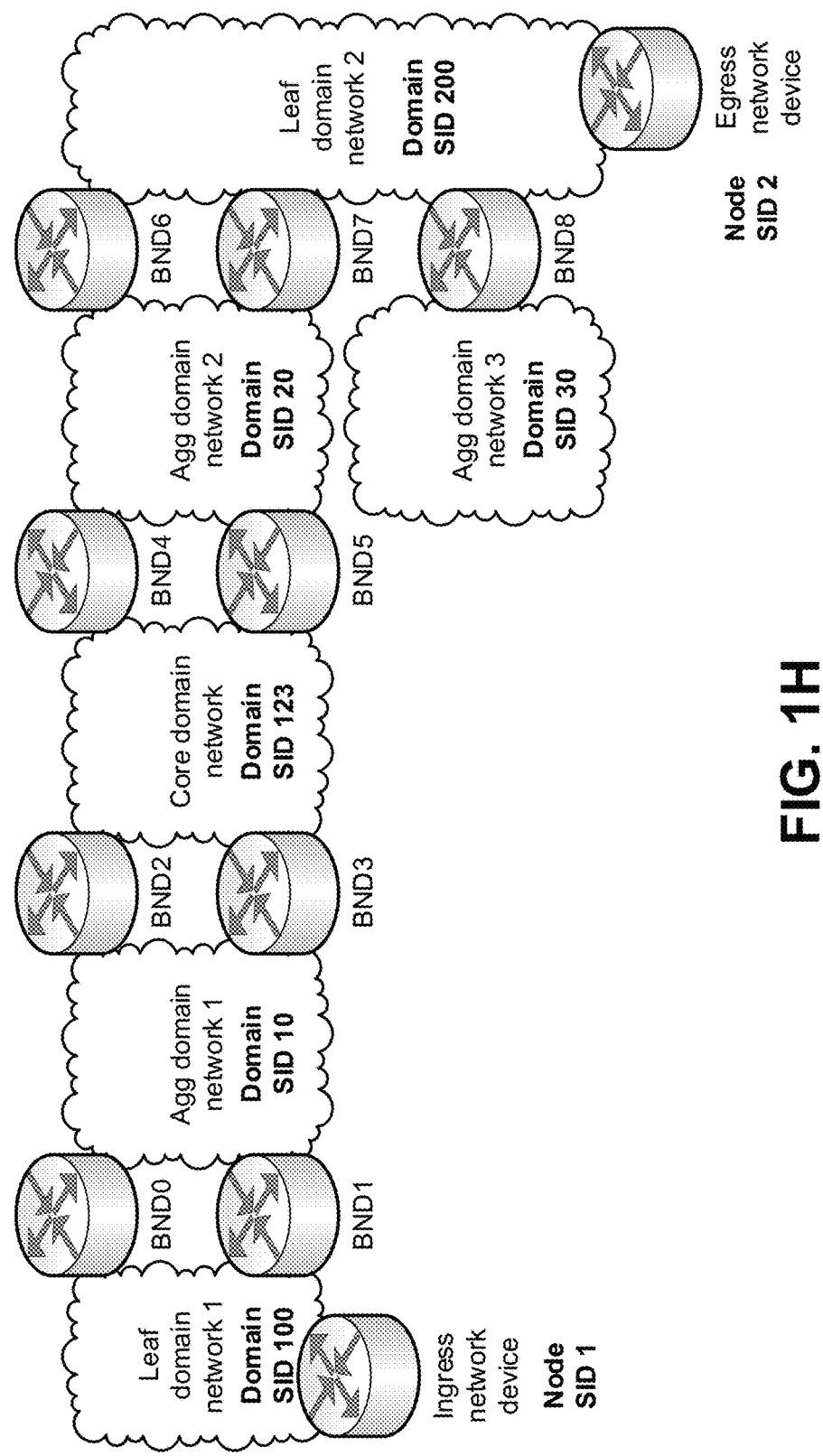

FIGS. 1F-1H provide examples of other multi-domain networks that may utilize domain segment identifiers for inter-domain shortest path segment routing. The multi-domain networks shown in FIGS. 1F-1H are provided merely as examples. Other multi-domain networks may utilize domain segment identifiers for inter-domain shortest path segment routing in a similar manner as described herein.

As shown in FIG. 1F, a multi-domain network may include a core domain network. The core domain network may be associated with a plurality of leaf domain networks (e.g., leaf domain network 1, leaf domain network 2, leaf domain network 3, and leaf domain network 4). The leaf domain networks may be independent of each other, associated with one another, included within one another, partially overlapping with one another, and/or the like. For example, leaf domain network 2 may be fully contained within leaf domain network 1 and be included as a subset of leaf domain network 1. Alternatively, leaf domain network 2 may be partially overlapping with leaf domain network 1.

The multi-domain network may include a plurality of ingress network devices (e.g., ingress network device 1 and ingress network device 2) and a plurality of egress network devices (e.g., egress network device 1 and egress network device 2). The ingress network devices and the egress network devices may be associated with a leaf domain network (e.g., ingress network device 1 is associated with leaf domain network 1, egress network device 1 is associated with leaf domain network 3, and/or the like).

The multi-domain network may include one or more border network devices between each domain network of the multi-domain network. The border network devices may be associated with the core domain network and one or more leaf domain networks. For example, border network device 1 may be associated with the core domain network and leaf domain network 1. Border network device 2 may be associated with the core domain network, leaf domain network 1, and leaf domain network 2. Border network device 3 may be associated with the core domain network and leaf domain network 2.

Similar to the multi-domain network described above with respect to FIGS. 1A-1E, each domain in the multi-domain network may be associated with a domain SID. For example, the core domain network may be associated with domain SID 123, leaf domain network 1 may be associated with domain SID 100, leaf domain network 2 may be associated with domain SID 200, leaf domain network 3 may be associated with domain SID 300, and leaf domain network 4 may be associated with domain SID 400. Likewise, each network device in the multi-domain network may be associated with a node SID. For example, ingress network device 1 may be associated with node SID 1, ingress network device 2 may be associated with node SID 2, egress network device 1 may be associated with node SID 3, and egress network device 2 may be associated with node SID 4. Additionally, the border network devices 1-6 may be associated with their own node SIDs.

The border network devices 1-6 may advertise the domain networks associated with network devices 1-6 in a similar manner as described above with respect to FIGS. 1A-1E (e.g., using domain SIDs). For example, border network device 2 may advertise to leaf domain network 1 and/or leaf domain network 2 that border network device 2 is associated with the core domain network by advertising the core domain SID 123 to leaf domain network 1 and/or leaf domain network 2. Border network device 5 may advertise to the core domain network that border network device 5 is associated with leaf domain network 3 and/or leaf domain network 4 by advertising domain SID 300 and/or domain SID 400 to the core domain network. As such, ingress network device 1 and/or ingress network device 2 may receive the domain SID associated with the core domain network (e.g., domain SID 123) via the leaf domain network associated with the ingress network device 1 and/or the leaf domain network associated with ingress network device 2 in a similar manner as described above.

Egress network device 1 and/or egress network device 2 may advertise the location data associated with egress network device 1 and/or egress network device 2 to ingress network device 1 and/or ingress network device 2 in a similar manner as described above (e.g., using a BGP-SR-TE segment list that identifies the core domain SID associated with the egress network device, the originating leaf domain SID associated with the egress network device, and the egress network device SID associated with the egress network device). For example, egress network device 1 may advertise the location data associated with egress network device to ingress network device 1 and/or ingress network device 2. Egress network device 2 may advertise the location data associated with egress network device to ingress network device 1 and/or ingress network device 2.

Ingress network device 1 and/or ingress network device 2 may receive the location data from one or more border network devices, as described above. For example, egress network device 1 may advertise a BGP-SR-TE segment list that identifies the node SID associated with egress network device 1 (e.g., node SID 3) to border network device 5. Border network device 5 may add the originating leaf domain SID (e.g., domain SID 300) to the BGP-SR-TE segment list and advertise the BGP-SR-TE segment list to border network device 1. Border network device 1 may add the core domain network SID (e.g., domain SID 123) to the BGP-SR-TE segment list and advertise the BGP-SR-TE segment list (e.g., including the core domain SID, the originating leaf domain SID, and the node SID associated with egress network device 1) to ingress network device 1.

The multi-domain network shown in FIG. 1F may cause traffic to be transmitted through the multi-domain network in a similar manner as described above with respect to FIGS. 1A-1E. For example, an ingress network device may receive traffic from an endpoint device, determine an egress network device that the traffic is destined for, determine one or more paths to reach the egress network device associated with the traffic (e.g., using a shortest path first technique), select a path from the ingress network device to the egress network device associated with the traffic, and cause the traffic to be transmitted through the multi-domain network to the appropriate egress network device via the selected path.

As shown in FIG. 1G, a multi-domain network may include a core domain network. The core domain network may be associated with one or more aggregation domain networks (e.g., aggregation domain network 1 and aggregation domain network 2). The one or more aggregation domain networks may be associated with one or more leaf domain networks (e.g., leaf domain network 1 and leaf domain network 2). In some implementations, there may be one or more aggregation domain networks between the core domain network and a leaf domain network.

The leaf domain networks may be associated with one or more ingress network devices and/or one or more egress network devices. The ingress network device may receive traffic from an endpoint device and the egress network device may transmit traffic from the multi-domain network to an endpoint device. The ingress network device and/or the egress network device may be associated with a leaf domain network. For example, the ingress network device may be associated with leaf domain network 1 and the egress network device may be associated with leaf domain network 2.

As further shown in FIG. 1G, there may be one or more border network devices (e.g., BND0-7) located between each domain network. The border network devices may be associated with the core domain network, one or more aggregation domain networks, and/or one or more leaf domain networks. For example, BND0 and BND1 may be associated with leaf domain network 1 and aggregation domain network 1. BND2 and BND3 may be associated with aggregation domain network 1 and the core domain network. The remaining border network devices may be associated with two or more domain networks in a similar manner.

The domain networks of the multi-domain network may be associated with a domain SID in a similar manner as described above with respect to FIGS. 1A-1E. For example, the core domain network may be associated with a domain SID 123, aggregation domain network 1 may be associated with a domain SID 10, and leaf domain network 1 may be associated with domain SID 100. The remaining domain networks may be associated with a respective domain SID in a similar manner.

The ingress network device and the egress network device may be associated with a respective node SID in a similar manner as described above with respect to FIGS. 1A-1E. For example, the ingress network device may be associated with node SID 1 and the egress network device may be associated with node SID 2. One or more (or all) border network devices may be associated with a respective node SID in a similar manner.

The border network devices may advertise the domain SID of domains associated with the border network devices in a similar manner as described above with respect to FIGS. 1A-1E. For example, BND2 and/or BND3 may advertise core domain network domain SID 123 to aggregation domain network 1. BND0 and/or BND1 may advertise aggregation domain network 1 domain SID 10 and/or core domain network domain SID 123 to leaf domain network 1. In this way, the ingress network device may know, based on receiving aggregation domain network 1 domain SID 10 and/or core domain network domain SID 123 from leaf domain network 1, that the ingress network device may reach the core domain network via leaf domain network 1 and aggregation domain network 1. The remaining border network devices may advertise the domain SIDs in a similar manner. For example, the egress network device may know that the egress network device may reach the core domain network via leaf domain network 2 and aggregation domain network 2, based on receiving core domain network domain SID 123 and aggregation domain network domain SID 20 from leaf domain network 2.

The egress network device may advertise the location data associated with the egress network device to the ingress network device in similar manner as described above (e.g., advertising SR Policies using BGP). The location data identified in the BGP-SR-TE list may include the core domain SID associated with the egress network device (e.g., domain SID 123), one or more aggregation domain network domain SIDs (e.g., domain SID 20), the originating leaf domain SID associated with the egress network device (e.g., domain SID 200), and the egress network device SID associated with the egress network device (e.g., node SID 2). For example, the egress network device may advertise the location data associated with egress network device to the ingress network device. The egress network device may advertise SR policies to the ingress network device using BGP and a route reflector.

The ingress network device may receive the location data from one or more border network devices, as described above. For example, the egress network device may advertise, using BGP, an SR policy that identifies the node SID associated with the egress network device (e.g., node SID 2) to BND6. BND6 may add the originating leaf domain SID (e.g., domain SID 200) to the SR policy and advertise the SR policy to BND5. BND5 may add the aggregation domain network 2 domain SID (e.g., domain SID 20) to the SR policy and advertise, via BGP, the SR policy to BND2. BND2 may add the core domain network SID (e.g., domain SID 123) to the SR policy and advertise, via BGP, the SR policy to BND1. BND 1 may add the aggregation domain network 1 domain SID (e.g., domain SID 10) to the SR policy and advertise, via BGP, the SR policy (e.g., including the core domain SID, each domain SID that is between the ingress network device and the egress network device, and the node SID associated with the egress network device) to the ingress network device.

The multi-domain network shown in FIG. 1G may cause traffic to be transmitted through the multi-domain network in a similar manner as described above with respect to FIGS. 1A-1E. For example, the ingress network device may receive traffic from an endpoint device, determine the egress network device that the traffic is destined for, determine one or more paths to reach the egress network device associated with the traffic (e.g., using a shortest path first technique), select a path from the ingress network device to the egress network device associated with the traffic, and cause the traffic to be transmitted through the multi-domain network to the appropriate egress network device via the selected path.

As shown in FIG. 1H, a multi-domain network may include a core domain network. The core domain network may be associated with one or more aggregation domain networks (e.g., aggregation domain network 1, aggregation domain network 2, and aggregation domain network 3). The one or more aggregation domain networks may be associated with one or more leaf domain networks (e.g., leaf domain network 1 and leaf domain network 2).

The leaf domain networks may be associated with one or more ingress network devices and/or one or more egress network devices. The ingress network device may receive traffic from an endpoint device and the egress network device may transmit traffic from the multi-domain network to an endpoint device. The ingress network device and/or the egress network device may be associated with a leaf domain network. For example, the ingress network device may be associated with leaf domain network 1 and the egress network device may be associated with leaf domain network 2.

As further shown in FIG. 1H, there may be one or more border network devices (e.g., BND0-8) located between each domain network. The border network devices may be associated with the core domain network, one or more aggregation domain networks, and/or one or more leaf domain networks. For example, BND0 and BND1 may be associated with leaf domain network 1 and aggregation domain network 1. BND5 may be associated with the core domain network, aggregation domain network 2, and aggregation domain network 3. BND 7 may be associated with aggregation domain network 2, aggregation domain network 3, and leaf domain network 2. The remaining border network devices may be associated with two or more domain networks in a similar manner.

The domain networks of the multi-domain network may be associated with a domain SID in a similar manner as described above with respect to FIGS. 1A-1E. For example, the core domain network may be associated with a domain SID 123, aggregation domain network 1 may be associated with a domain SID 10, and leaf domain network 1 may be associated with domain SID 100. The remaining domain networks may be associated with a domain SID in a similar manner.

The ingress network device and the egress network device may be associated with a node SID in a similar manner as described above with respect to FIGS. 1A-1E. For example, the ingress network device may be associated with node SID 1 and the egress network device may be associated with node SID 2. One or more (or all) border network devices may be associated with a node SID in a similar manner.

The border network devices may advertise the domain SID of domains associated with the border network devices in a similar manner as described above with respect to FIGS. 1A-1E. For example, BND2 and/or BND3 may advertise core domain network domain SID 123 to aggregation domain network 1. BND0 and/or BND1 may advertise aggregation domain network 1 domain SID 10 and/or core domain network domain SID 123 to leaf domain network 1. In this way, the ingress network device may know, based on receiving aggregation domain network 1 domain SID 10 and/or core domain network domain SID 123 from leaf domain network 1, that the ingress network device may reach the core domain network via leaf domain network 1 and aggregation domain network 1.

BND5 may advertise the core domain network domain SID 123 to aggregation domain network 2 and/or aggregation domain network 3. BND 7 may advertise the core domain network domain SID 123, aggregation domain network 2 domain SID 20, and/or aggregation domain network 3 domain SID 30 to leaf domain network 2. In this way, the egress network device may know, based on receiving the core domain network domain SID 123, aggregation domain network 2 domain SID 20, and/or aggregation domain network 3 domain SID 30 from the leaf domain network 2, that the egress network device may reach the core domain network through one or more paths. For example, the egress network device may receive traffic from the core domain network through the aggregation domain network 2 and the leaf domain network 2. Additionally, or alternatively, the egress network device may receive traffic from the core domain network through the aggregation domain network 3 and the leaf domain network 2. As such, the egress network device may store location data associated with the egress network device that identifies the core domain network domain SID 123, aggregation domain network 2 domain SID 20, aggregation domain network 3 domain SID 30, and leaf domain network 2 domain SID 200. The remaining border network devices may advertise the domain SIDs in a similar manner.

The egress network device may advertise the location data associated with the egress network device to the ingress network device in similar manner as described above (e.g., using a BGP-SR-TE segment list). The location data identified in the BGP-SR-TE list may include the core domain SID associated with the egress network device (e.g., domain SID 123), one or more aggregation domain network domain SIDs (e.g., domain SID 20 and/or domain SID 30), the originating leaf domain SID associated with the egress network device (e.g., domain SID 200), and/or the egress network device SID associated with the egress network device (e.g., node SID 2). For example, the egress network device may advertise the location data associated with egress network device to the ingress network device. The egress network device may advertise the BGP-SR-TE segment list to the ingress network device using a route reflector.

The ingress network device may receive the location data from one or more border network devices, as described above. For example, the egress network device may advertise a BGP-SR-TE segment list that identifies the node SID associated with the egress network device (e.g., node SID 2) to BND6. BND6 may add the originating leaf domain SID (e.g., domain SID 200) to the BGP-SR-TE segment list and advertise the BGP-SR-TE segment list to BND5. BND5 may add the aggregation domain network 2 domain SID (e.g., domain SID 20) to the BGP-SR-TE segment list and advertise the BGP-SR-TE segment list to BND2. BND2 may add the core domain network SID (e.g., domain SID 123) to the BGP-SR-TE segment list and advertise the BGP-SR-TE segment list to BND1. BND 1 may add the aggregation domain network 1 domain SID (e.g., domain SID 10) to the BGP-SR-TE segment list and advertise the BGP-SR-TE segment list (e.g., including the core domain SID, each domain SID that is between the ingress network device and the egress network device, and the node SID associated with the egress network device) to the ingress network device.

Additionally, or alternatively, the ingress network device may receive the BGP-SR-TE segment list that has traveled from the egress network device through leaf domain network 2, to BND8, through aggregation domain network 3, to BND5, through the core domain network, to BND3, through aggregation domain network 1, to BND0, through leaf domain network 1, to the ingress network device. In that case, the BGP-SR-TE segment list may identify location data associated with the egress network device that identifies the following SIDs: 10, 123, 30, 200, 2. As such, the ingress network device may receive one or more sets of location data (via one or more BGP-SR-TE segment lists initiated by the egress network device) associated with the same egress network device. For example, as shown in FIG. 1H, the ingress network device may receive a first set of location data that identifies SIDs: 10, 123, 20, 200, 2, and a second set of location data that identifies SIDs: 10, 123, 30, 200, 2. In this way, the ingress network device may identify that the ingress network device may transmit traffic to the egress network device through one or more combinations of domains within the multi-domain network.

The multi-domain network shown in FIG. 1H may cause traffic to be transmitted through the multi-domain network in a similar manner as described above with respect to FIGS. 1A-1E. For example, the ingress network device may receive traffic from an endpoint device, determine the egress network device that the traffic is destined for, determine one or more paths to reach the egress network device associated with the traffic (e.g., using a shortest path first technique), select a path from the ingress network device to the egress network device associated with the traffic, and cause the traffic to be transmitted through the multi-domain network to the appropriate egress network device via the selected path.

As indicated above, the multi-domain networks shown in FIGS. 1F-1H are provided merely as additional examples of multi-domain network arrangements that may utilize domain segment identifiers for inter-domain shortest path segment routing. The principles described in connection with FIGS. 1A-1E can be applied to these arrangements and/or other arrangements of multi-domain networks.

In this way, a network device may utilize domain segment identifiers for inter-domain shortest path segment routing in a multi-domain network. This conserves computing resources (e.g., processing resources, memory resources, communication resources, and/or the like), networking resources, and/or the like that would otherwise have been used in transmitting detailed state information throughout a multi-domain network, maintaining state information associated with the multi-domain network, attempting to provide end-to-end or any-to-any reachability for the multi-domain network, and/or the like. Furthermore, implementations described herein use a rigorous, computerized process to perform tasks that were not previously performed. For example, currently there does not exist a technique that utilizing domain segment identifiers for inter-domain shortest path segment routing in a multi-domain network, in the manner described herein.

As indicated above, FIGS. 1A-1H are provided merely as examples. Other examples may differ from what is described with regard to FIGS. 1A-1H. The number and arrangement of devices and/or networks shown in FIGS. 1A-1H are provided as one or more examples. In practice, there may be additional devices and/or networks, fewer devices and/or networks, different devices and/or networks, or differently arranged devices and/or networks than those shown in FIGS. 1A-1H. Furthermore, two or more devices and/or networks shown in FIGS. 1A-1H may be implemented within a single device and/or networks, or a single device and/or networks shown in FIGS. 1A-1H may be implemented as multiple, distributed devices and/or networks. Additionally, or alternatively, a set of devices and/or networks (e.g., one or more devices and/or networks) of FIGS. 1A-1H may perform one or more functions described as being performed by another set of devices and/or networks of FIGS. 1A-1H.

Figure 2:
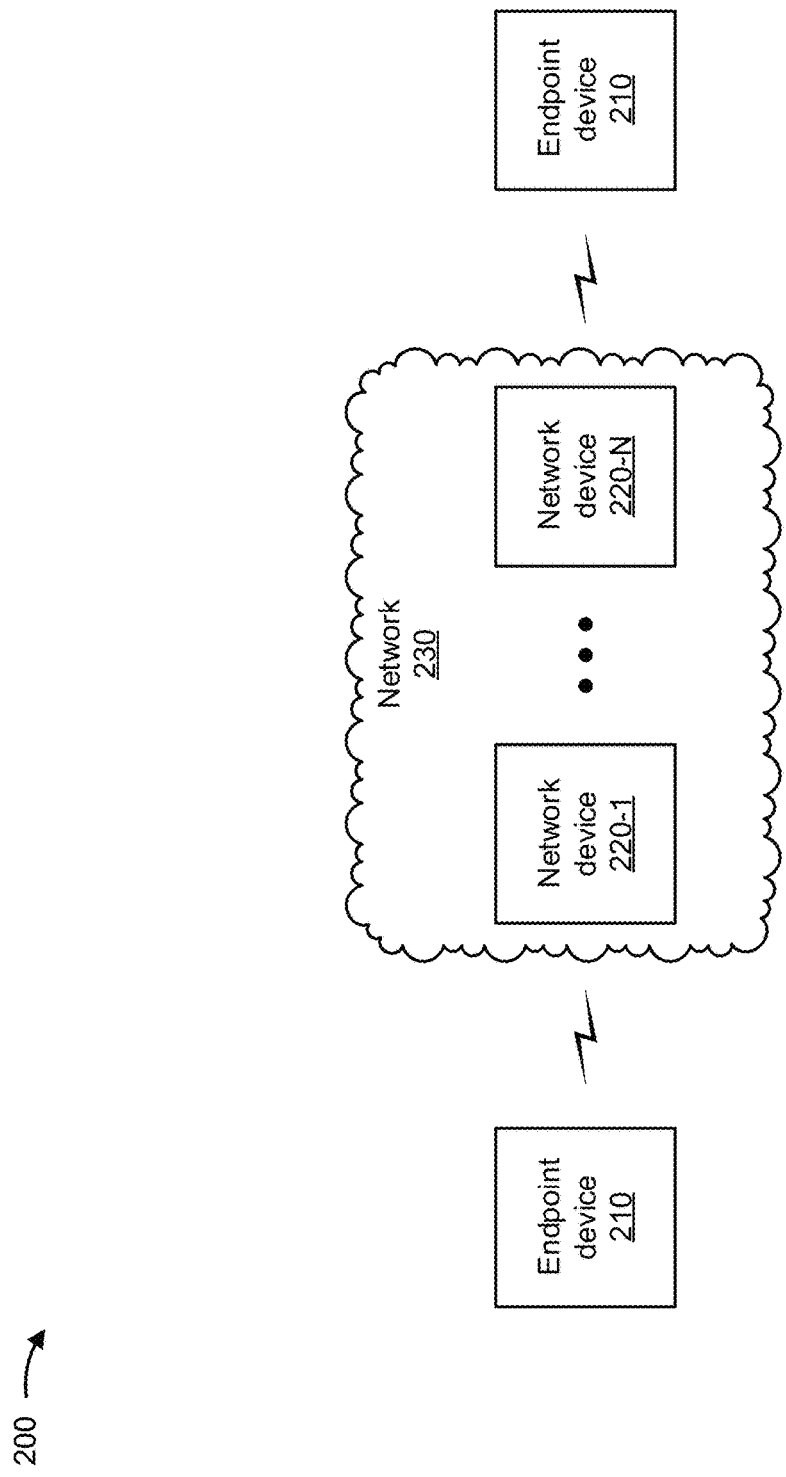
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include multiple endpoint devices 210, a group of network devices 220 (shown as network device 220-1 through network device 220-N), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, an edge device, or a similar type of device. In some implementations, endpoint device 210 may receive network traffic from and/or may provide network traffic to other endpoint devices 210 via network 230 (e.g., by routing packets using network devices 220 as intermediaries).

Network device 220 includes one or more devices capable of receiving, processing, storing, routing, and/or providing traffic (e.g., a packet, other information or metadata, and/or the like) in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
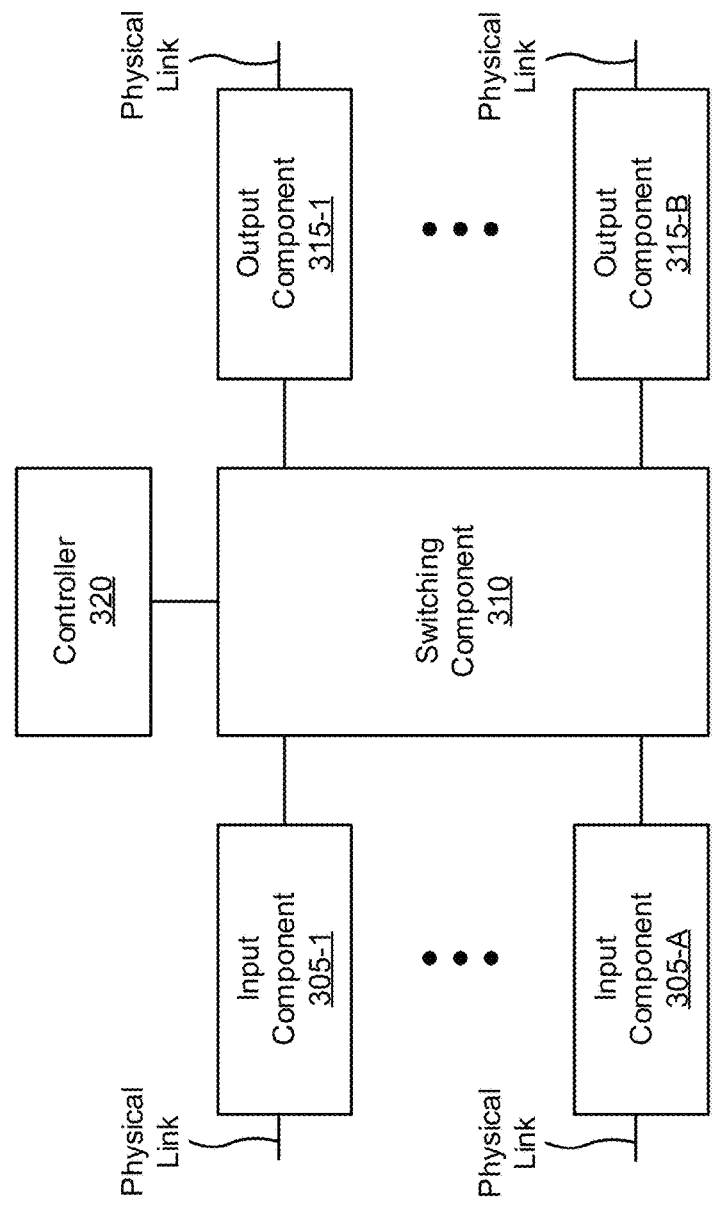
FIGS. 3 and 4 are diagrams of example components of one or more devices of FIG. 2.

FIG. 3 is a diagram of example components of a device 300. Device 300 may correspond to network device 220. In some implementations, network device 220 may include one or more devices 300 and/or one or more components of device 300. As shown in FIG. 3, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a controller 320.

Input components 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, and/or a combination of software and hardware. In some implementations, controller 320 may include one or more processors that can be programmed to perform a function.

In some implementations, controller 320 may include a random-access memory (RAM), a read only memory (ROM), and/or another type of dynamic or static storage device (e.g., a flash memory, a magnetic memory, an optical memory, and/or the like) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some cases, controller 320 may create a session table based on information determined while initializing a link fault detection session and may forward the session table to input components 305 and/or output components 315.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
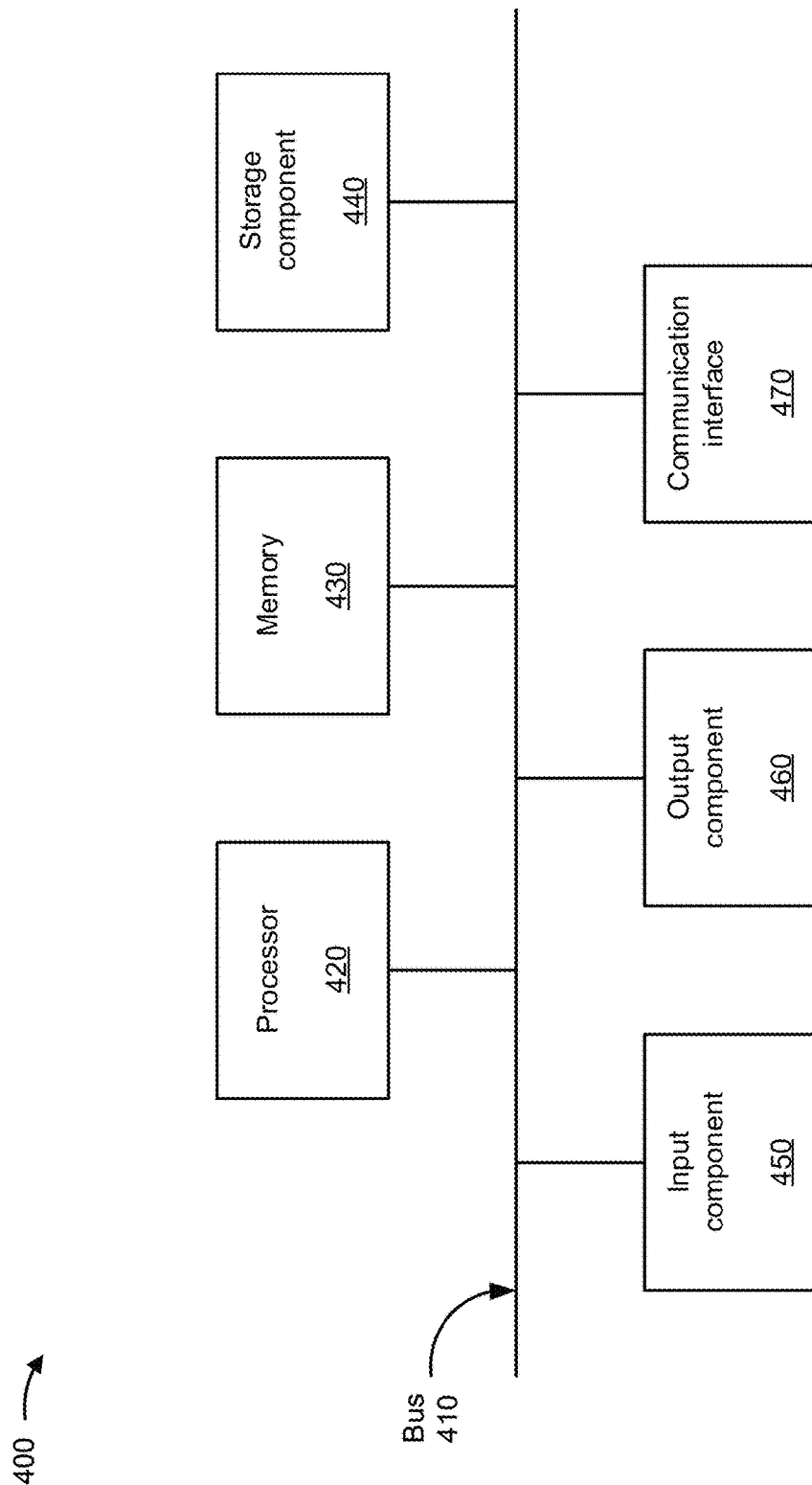

FIG. 4 is a diagram of example components of a device 400. Device 400 may correspond to endpoint device 210 and/or network device 220. In some implementations, endpoint device 210 and/or network device 220 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
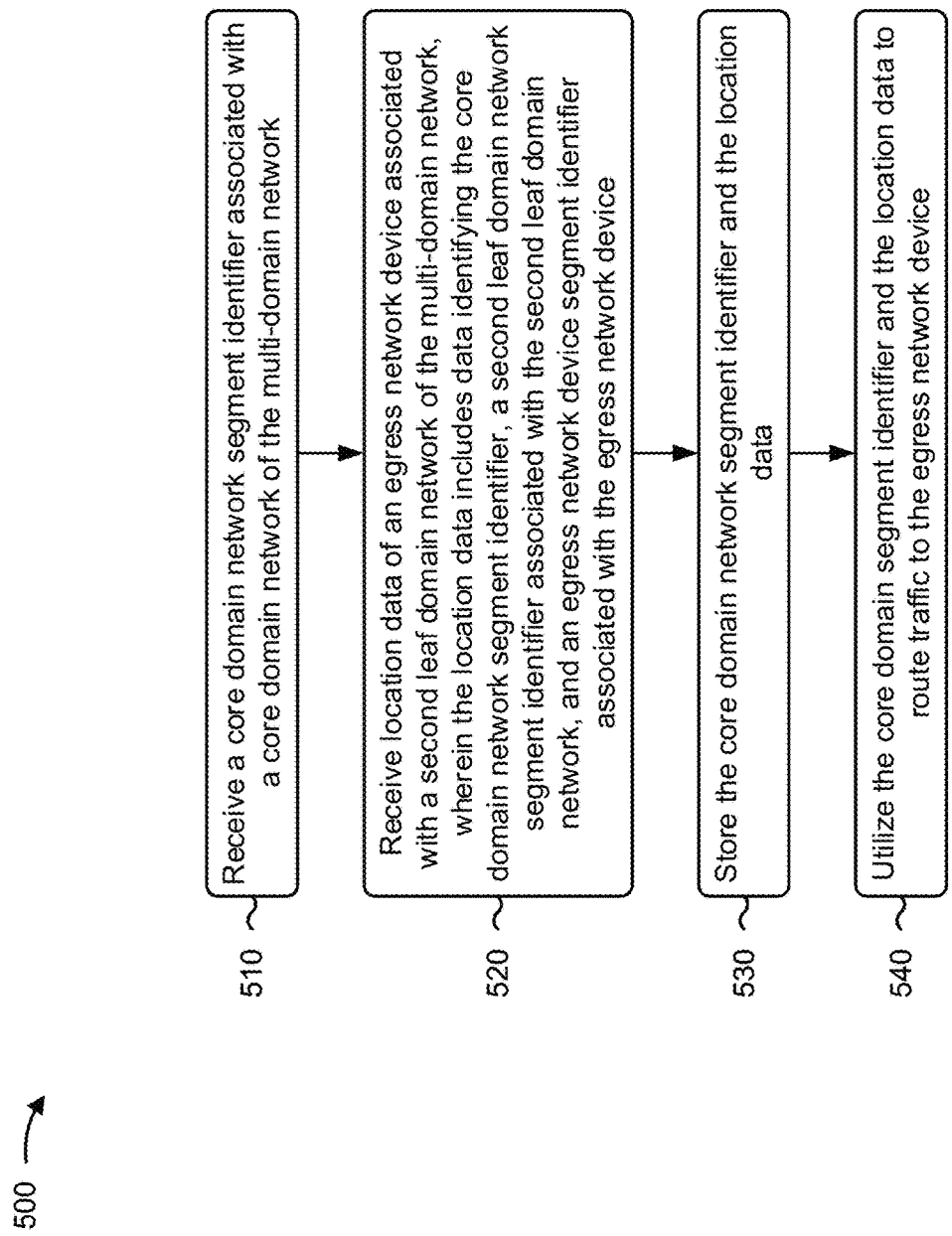
FIGS. 5-7 are flow charts of example processes for utilizing domain segment identifiers for inter-domain shortest path segment routing.

FIG. 5 is a flow chart of an example process 500 for utilizing domain segment identifiers for inter-domain shortest path segment routing. In some implementations, one or more process blocks of FIG. 5 may be performed by an ingress network device (e.g., network device 220). In some implementations, one or more process blocks of FIG. 5 may be performed by another device or a group of devices separate from or including the ingress network device, such as an endpoint device (e.g., endpoint device 210).

As shown in FIG. 5, process 500 may include receiving a core domain network segment identifier associated with a core domain network of the multi-domain network (block 510). For example, the ingress network device (e.g., using input component 305, switching component 310, controller 320, processor 420, communication interface 470, and/or the like) may receive a core domain network segment identifier associated with a core domain network of the multi-domain network, as described above.

As further shown in FIG. 5, process 500 may include receiving location data of an egress network device associated with a second leaf domain network of the multi-domain network, wherein the location data includes data identifying the core domain network segment identifier, a second leaf domain network segment identifier associated with the second leaf domain network, and an egress network device segment identifier associated with the egress network device (block 520). For example, the ingress network device (e.g., using input component 305, switching component 310, controller 320, processor 420, communication interface 470, and/or the like) may receive location data of an egress network device associated with a second leaf domain network of the multi-domain network, as described above. In some implementations, the location data includes data identifying the core domain network segment identifier, a second leaf domain network segment identifier associated with the second leaf domain network, and an egress network device segment identifier associated with the egress network device.

As further shown in FIG. 5, process 500 may include storing the core domain network segment identifier and the location data (block 530). For example, the ingress network device (e.g., using switching component 310, controller 320, processor 420, memory 430, storage component 440, and/or the like) may store the core domain network segment identifier and the location data, as described above.

As further shown in FIG. 5, process 500 may include utilizing the core domain segment identifier and the location data to route traffic to the egress network device (block 540). For example, the ingress network device (e.g., using switching component 310, output component 315, controller 320, processor 420, memory 430, storage component 440, communication interface 470, and/or the like) may utilize the core domain segment identifier and the location data to route traffic to the egress network device, as described above.

Process 500 may include additional implementations, such as any single implementation or any combination of implementations described below and/or in connection with one or more other processes described elsewhere herein.

In a first implementation, receiving the location data of the egress network device includes receiving the location data of the egress network device via an advertisement with a segment list that includes the data identifying the core domain network segment identifier, the second leaf domain network segment identifier, and the egress network device segment identifier.

In a second implementation, alone or in combination with the first implementation, process 500 includes receiving particular traffic destined for the egress network device; determining a path for the particular traffic, through the multi-domain network and to the egress network device, based on the core domain network segment identifier and the location data; and causing the particular traffic to be provided to the egress network device via the path.

In a third implementation, alone or in combination with one or more of the first and second implementations, determining the path for the particular traffic includes determining a plurality of paths, through the multi-domain network and to the egress network device, based on the core domain network segment identifier and the location data, and selecting the path, from the plurality of paths, based on a candidate path preference parameter.

In a fourth implementation, alone or in combination with one or more of the first through third implementations, the path includes a shortest label-switched path through the multi-domain network and to the egress network device.

In a fifth implementation, alone or in combination with one or more of the first through fourth implementations, the core domain network segment identifier is received from a border network device provided between the first leaf domain network and the core domain network.

In a sixth implementation, alone or in combination with one or more of the first through fifth implementations, the multi-domain network includes the core domain network and two or more leaf domain networks associated with the core domain network, where the first leaf domain network and second leaf domain network are included in the two or more leaf domain networks.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
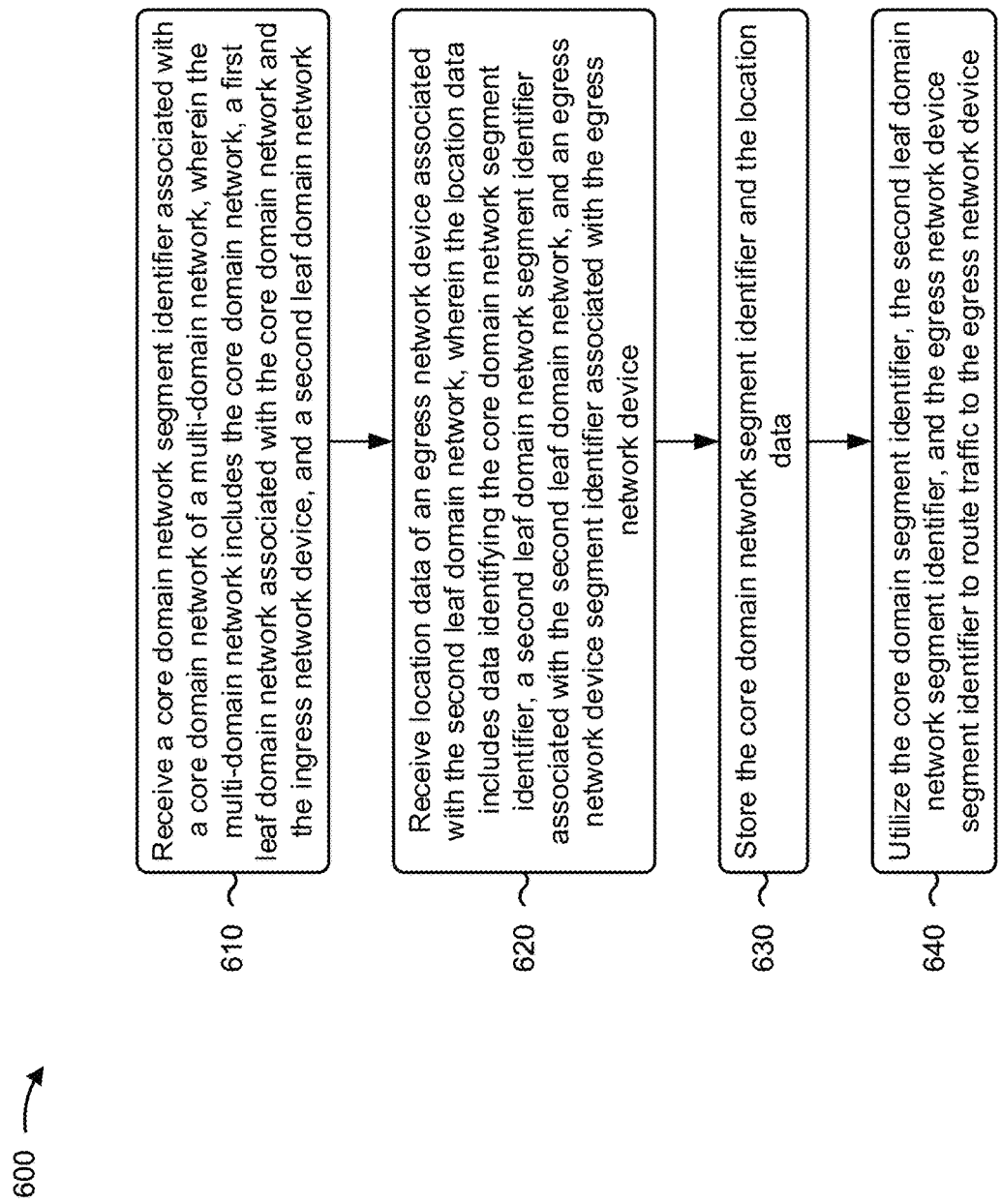

FIG. 6 is a flow chart of an example process 600 for utilizing domain segment identifiers for inter-domain shortest path segment routing. In some implementations, one or more process blocks of FIG. 6 may be performed by an ingress network device (e.g., network device 220). In some implementations, one or more process blocks of FIG. 6 may be performed by another device or a group of devices separate from or including the ingress network device, such as an endpoint device (e.g., endpoint device 210).

As shown in FIG. 6, process 600 may include receiving a core domain network segment identifier associated with a core domain network of a multi-domain network, wherein the multi-domain network includes the core domain network, a first leaf domain network associated with the core domain network and the ingress network device, and a second leaf domain network (block 610). For example, the ingress network device (e.g., using input component 305, switching component 310, controller 320, processor 420, communication interface 470, and/or the like) may receive a core domain network segment identifier associated with a core domain network of a multi-domain network, as described above. In some implementations, the multi-domain network includes the core domain network, a first leaf domain network associated with the core domain network and the ingress network device, and a second leaf domain network.

As further shown in FIG. 6, process 600 may include receiving location data of an egress network device associated with the second leaf domain network, wherein the location data includes data identifying the core domain network segment identifier, a second leaf domain network segment identifier associated with the second leaf domain network, and an egress network device segment identifier associated with the egress network device (block 620). For example, the ingress network device (e.g., using input component 305, switching component 310, controller 320, processor 420, memory 430, communication interface 470, and/or the like) may receive location data of an egress network device associated with the second leaf domain network, as described above. In some implementations, the location data includes data identifying the core domain network segment identifier, a second leaf domain network segment identifier associated with the second leaf domain network, and an egress network device segment identifier associated with the egress network device.

As further shown in FIG. 6, process 600 may include storing the core domain network segment identifier and the location data (block 630). For example, the ingress network device (e.g., using switching component 310, controller 320, processor 420, storage component 440, and/or the like) may store the core domain network segment identifier and the location data, as described above.

As further shown in FIG. 6, process 600 may include utilizing the core domain segment identifier, the second leaf domain network segment identifier, and the egress network device segment identifier to route traffic to the egress network device (block 640). For example, the ingress network device (e.g., using switching component 310, output component 315, controller 320, processor 420, memory 430, storage component 440, communication interface 470, and/or the like) may utilize the core domain segment identifier, the second leaf domain network segment identifier, and the egress network device segment identifier to route traffic to the egress network device, as described above.

Process 600 may include additional implementations, such as any single implementation or any combination of implementations described below and/or in connection with one or more other processes described elsewhere herein.

In a first implementation, the first leaf domain network is associated with a first leaf domain network segment identifier and the ingress network device is associated with an ingress network device segment identifier.

In a second implementation, alone or in combination with the first implementation, utilizing the core domain segment identifier, the second leaf domain network segment identifier, and the egress network device segment identifier to route traffic to the egress network device includes determining one or more shortest label-switched paths through the multi-domain network and to the egress network device based on the core domain segment identifier, the second leaf domain network segment identifier, and the egress network device segment identifier; and causing the traffic to be routed to the egress network device via the one or more shortest label-switched paths.

In a third implementation, alone or in combination with one or more of the first and second implementations, process 600 includes receiving particular traffic destined for a network device of the first leaf domain network; determining a shortest label-switched path through the first leaf domain network and to the network device; and causing the particular traffic to be provided to the network device via the shortest label-switched path.

In a fourth implementation, alone or in combination with one or more of the first through third implementations, process 600 includes receiving, from the egress network device, a tunnel encapsulation attribute; and utilizing the core domain segment identifier, the second leaf domain network segment identifier, and the egress network device segment identifier to route the traffic to the egress network device includes utilizing the core domain segment identifier, the second leaf domain network segment identifier, the egress network device segment identifier, and the tunnel encapsulation attribute to route traffic to the egress network device via an encapsulated tunnel.

In a fifth implementation, alone or in combination with one or more of the first through fourth implementations, forwarding state information associated with the egress network device is locally stored in the second leaf domain network.

In a sixth implementation, alone or in combination with one or more of the first through fifth implementations, utilizing the core domain segment identifier, the second leaf domain network segment identifier, and the egress network device segment identifier to route the traffic to the egress network device includes utilizing the core domain segment identifier, the second leaf domain network segment identifier, the egress network device segment identifier, and a shortest path first technique to route traffic to the egress network device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
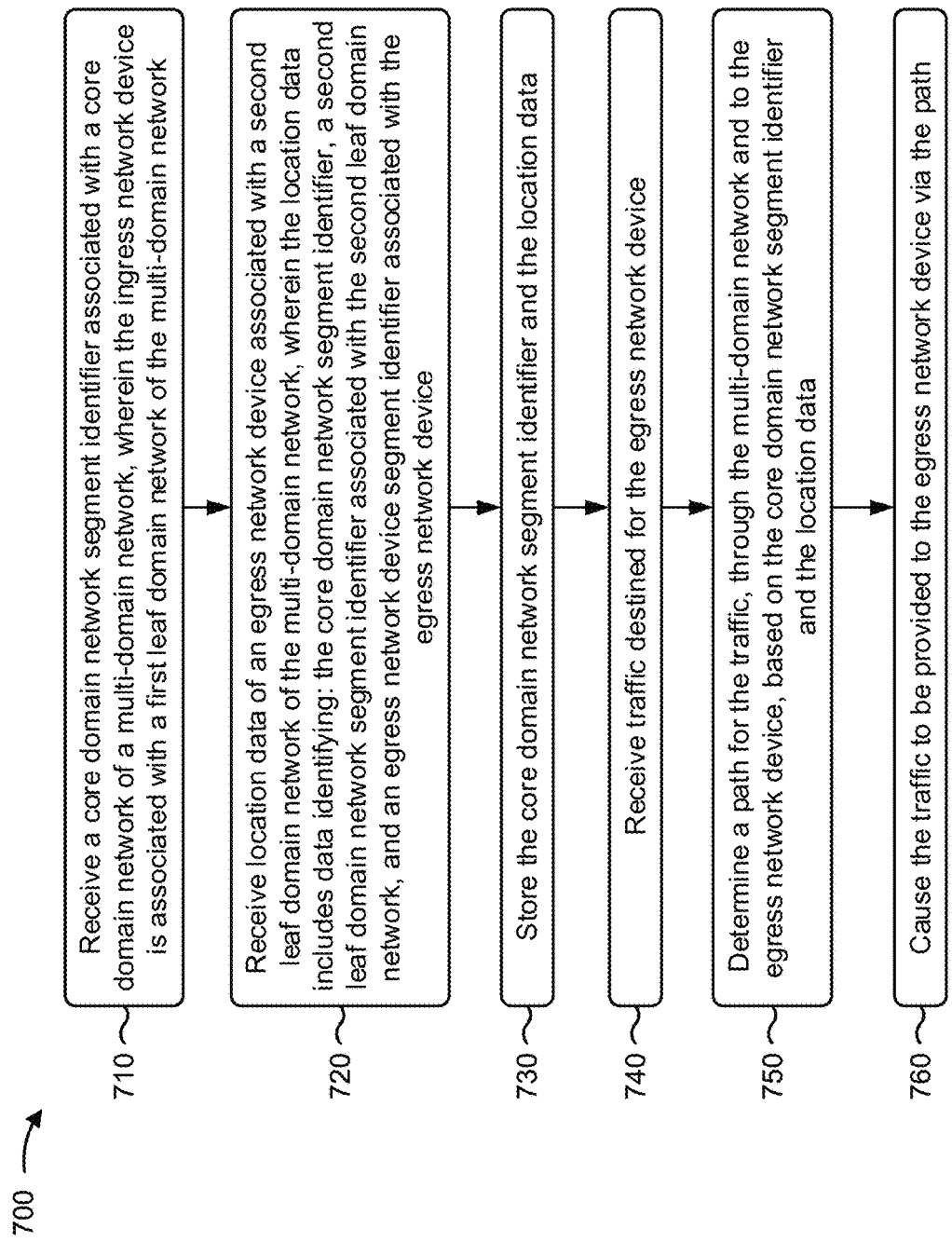

FIG. 7 is a flow chart of an example process 700 for utilizing domain segment identifiers for inter-domain shortest path segment routing. In some implementations, one or more process blocks of FIG. 7 may be performed by an ingress network device (e.g., network device 220). In some implementations, one or more process blocks of FIG. 7 may be performed by another device or a group of devices separate from or including the ingress network device, such as an endpoint device (e.g., endpoint device 210).

As shown in FIG. 7, process 700 may include receiving a core domain network segment identifier associated with a core domain network of a multi-domain network, wherein the ingress network device is associated with a first leaf domain network of the multi-domain network (block 710). For example, the ingress network device (e.g., using input component 305, switching component 310, controller 320, processor 420, communication interface 470, and/or the like) may receive a core domain network segment identifier associated with a core domain network of a multi-domain network, as described above. In some implementations, the ingress network device is associated with a first leaf domain network of the multi-domain network.

As further shown in FIG. 7, process 700 may include receiving location data of an egress network device associated with a second leaf domain network of the multi-domain network, wherein the location data includes data identifying the core domain network segment identifier, a second leaf domain network segment identifier associated with the second leaf domain network, and an egress network device segment identifier associated with the egress network device (block 720). For example, the ingress network device (e.g., using input component 305, switching component 310, controller 320, processor 420, memory 430, communication interface 470, and/or the like) may receive location data of an egress network device associated with a second leaf domain network of the multi-domain network, as described above. In some implementations, the location data includes data identifying the core domain network segment identifier, a second leaf domain network segment identifier associated with the second leaf domain network, and an egress network device segment identifier associated with the egress network device.

As further shown in FIG. 7, process 700 may include storing the core domain network segment identifier and the location data (block 730). For example, the ingress network device (e.g., using input switching component 310, controller 320, processor 420, storage component 440, and/or the like) may store the core domain network segment identifier and the location data, as described above.

As further shown in FIG. 7, process 700 may include receiving traffic destined for the egress network device (block 740). For example, the ingress network device (e.g., using input component 305, switching component 310, controller 320, processor 420, communication interface 470, and/or the like) may receive traffic destined for the egress network device, as described above.

As further shown in FIG. 7, process 700 may include determining a path for the traffic, through the multi-domain network and to the egress network device, based on the core domain network segment identifier and the location data (block 750). For example, the ingress network device (e.g., using switching component 310, controller 320, processor 420, memory 430, and/or the like) may determine a path for the traffic, through the multi-domain network and to the egress network device, based on the core domain network segment identifier and the location data, as described above.

As further shown in FIG. 7, process 700 may include causing the traffic to be provided to the egress network device via the path (block 760). For example, the ingress network device (e.g., using switching component 310, output component 315, controller 320, processor 420, memory 430, storage component 440, communication interface 470, and/or the like) may cause the traffic to be provided to the egress network device via the path, as described above.

Process 700 may include additional implementations, such as any single implementation or any combination of implementations described below and/or in connection with one or more other processes described elsewhere herein.

In a first implementation, receiving the location data of the egress network device includes receiving the location data of the egress network device via an advertisement with a segment list that includes the data identifying the core domain network segment identifier, the second leaf domain network segment identifier, and the egress network device segment identifier.

In a second implementation, alone or in combination with the first implementation, determining the path for the traffic includes determining a plurality of paths for the traffic, through the multi-domain network and to the egress network device, based on the core domain network segment identifier and the location data; and selecting the path, from the plurality of paths, based on a candidate path preference parameter.

In a third implementation, alone or in combination with one or more of the first and second implementations, the path includes a shortest label-switched path through the multi-domain network and to the egress network device.

In a fourth implementation, alone or in combination with one or more of the first through third implementations, process 700 includes receiving additional traffic destined for a network device of the first leaf domain network; determining a shortest path through the first leaf domain network and to the network device; and causing the additional traffic to be provided to the network device via the shortest path.

In a fifth implementation, alone or in combination with one or more of the first through fourth implementations, process 700 includes receiving, from the egress network device, a tunnel encapsulation attribute, and causing the traffic to be provided to the egress network device via the path includes utilizing the tunnel encapsulation attribute to cause the traffic to be provided to the egress network device via an encapsulated tunnel.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by an ingress network device associated with a first leaf domain network of a multi-domain network, a core domain network segment identifier associated with a core domain network of the multi-domain network;
receiving, by the ingress network device, location data of an egress network device associated with a second leaf domain network of the multi-domain network,
wherein the core domain network is a gateway from the first leaf domain network to the second leaf domain network, and
wherein the location data includes data identifying:
the core domain network segment identifier, wherein the core domain network segment identifier identifies a shortest path segment routing within the core domain network,
a second leaf domain network segment identifier associated with the second leaf domain network,
wherein the second leaf domain network segment identifier identifies a shortest path segment routing within the second leaf domain network, and an egress network device segment identifier associated with the egress network device, storing, by the ingress network device, the core domain network segment identifier and the location data; and utilizing, by the ingress network device, the core domain network segment identifier and the location data to route traffic to the egress network device.

2. The method of claim 1, wherein receiving the location data of the egress network device comprises:

receiving the location data of the egress network device via an advertisement with a segment list that includes the data identifying the core domain network segment identifier, the second leaf domain network segment identifier, and the egress network device segment identifier.

3. The method of claim 1, further comprising:

receiving particular traffic destined for the egress network device;

determining a path for the particular traffic, through the multi-domain network and to the egress network device, based on the core domain network segment identifier and the location data; and causing the particular traffic to be provided to the egress network device via the path.

4. The method of claim 3, wherein determining the path for the particular traffic comprises:

determining a plurality of paths, through the multi-domain network and to the egress network device, based on the core domain network segment identifier and the location data; and selecting the path, from the plurality of paths, based on a candidate path preference parameter.

5. The method of claim 3, wherein the path includes a shortest label-switched path through the multi-domain network and to the egress network device.

6. The method of claim 1, wherein the core domain network segment identifier is received from another border network device provided between the first leaf domain network and the core domain network.

7. The method of claim 1, wherein the multi-domain network includes the core domain network and two or more leaf domain networks associated with the core domain network, wherein the first leaf domain network and the second leaf domain network are included in the two or more leaf domain networks.

8. An ingress network device, comprising:

one or more memories; and one or more processors to:

receive a core domain network segment identifier associated with a core domain network of a multi-domain network, wherein the multi-domain network includes:

the core domain network, a first leaf domain network associated with the core domain network and the ingress network device, and a second leaf domain network;

receive location data of an egress network device associated with the second leaf domain network, wherein the core domain network is a gateway from the first leaf domain network to the second leaf domain network, and wherein the location data includes data identifying: the core domain network segment identifier, wherein the core domain network segment identifier identifies a shortest path segment routing within the core domain network, a second leaf domain network segment identifier associated with the second leaf domain network, wherein the second leaf domain network segment identifier identifies a shortest path segment routing within the second leaf domain network, and an egress network device segment identifier associated with the egress network device;

store the core domain network segment identifier and the location data; and utilize the core domain network segment identifier, the second leaf domain network segment identifier, and the egress network device segment identifier to route traffic to the egress network device.

9. The ingress network device of claim 8, wherein the first leaf domain network is associated with a first leaf domain network segment identifier and the ingress network device is associated with an ingress network device segment identifier.

10. The ingress network device of claim 8, wherein the one or more processors, when utilizing the core domain network segment identifier, the second leaf domain network segment identifier, and the egress network device segment identifier to route traffic to the egress network device, are to:

determine one or more shortest label-switched paths through the multi-domain network and to the egress network device based on the core domain network segment identifier, the second leaf domain network segment identifier, and the egress network device segment identifier; and cause the traffic to be routed to the egress network device via the one or more shortest label-switched paths.

11. The ingress network device of claim 8, wherein the one or more processors are further to:

receive particular traffic destined for a network device of the first leaf domain network;

determine a shortest label-switched path through the first leaf domain network and to the network device; and cause the particular traffic to be provided to the network device via the shortest label-switched path.

12. The ingress network device of claim 8, wherein the one or more processors are further to:

receive, from the egress network device, a tunnel encapsulation attribute, wherein the one or more processors, when utilizing the core domain network segment identifier, the second leaf domain network segment identifier, and the egress network device segment identifier to route the traffic to the egress network device, are to:

utilize the core domain network segment identifier, the second leaf domain network segment identifier, the egress network device segment identifier, and the tunnel encapsulation attribute to route traffic to the egress network device via an encapsulated tunnel.

13. The ingress network device of claim 8, wherein forwarding state information associated with the egress network device is locally stored in the second leaf domain network.

14. The ingress network device of claim 8, wherein the one or more processors, when utilizing the core domain network segment identifier, the second leaf domain network segment identifier, and the egress network device segment identifier to route traffic to the egress network device, are to:
utilize the core domain network segment identifier, the second leaf domain network segment identifier, the egress network device segment identifier, and a shortest path first technique to route traffic to the egress network device.

15. A non-transitory computer-readable medium storing instructions, the instructions comprising:
one or more instructions that, when executed by one or more processors of an ingress network device, cause the one or more processors to:
receive a core domain network segment identifier associated with a core domain network of a multi-domain network,
wherein the ingress network device is associated with a first leaf domain network of the multi-domain network;
receive location data of an egress network device associated with a second leaf domain network of the multi-domain network,
wherein the core domain network is a gateway from the first leaf domain network to the second leaf domain network, and
wherein the location data includes data identifying:
the core domain network segment identifier,
wherein the core domain network segment identifier identifies a shortest path segment routing within the core domain network,
a second leaf domain network segment identifier associated with the second leaf domain network,
wherein the second leaf domain network segment identifier identifies a shortest path segment routing within the second leaf domain network, and
an egress network device segment identifier associated with the egress network device;
store the core domain network segment identifier and the location data;
receive traffic destined for the egress network device;
determine a path for the traffic, through the multi-domain network and to the egress network device, based on the core domain network segment identifier and the location data; and
cause the traffic to be provided to the egress network device via the path.

16. The non-transitory computer-readable medium of claim 15, wherein the one or more instructions, that cause the one or more processors to receive the location data of the egress network device, cause the one or more processors to:
receive the location data of the egress network device via an advertisement with a segment list that includes the data identifying the core domain network segment identifier, the second leaf domain network segment identifier, and the egress network device segment identifier.

17. The non-transitory computer-readable medium of claim 15, wherein the one or more instructions, that cause the one or more processors to determine the path for the traffic, cause the one or more processors to:
determine a plurality of paths for the traffic, through the multi-domain network and to the egress network device, based on the core domain network segment identifier and the location data; and
select the path, from the plurality of paths, based on a candidate path preference parameter.

18. The non-transitory computer-readable medium of claim 15, wherein the path includes a shortest label-switched path through the multi-domain network and to the egress network device.

19. The non-transitory computer-readable medium of claim 15, wherein the one or more instructions, when executed by the one or more processors, further cause the one or more processors to:
receive additional traffic destined for a network device of the first leaf domain network;
determine a shortest path through the first leaf domain network and to the network device; and
cause the additional traffic to be provided to the network device via the shortest path.

20. The non-transitory computer-readable medium of claim 15, wherein the one or more instructions, when executed by the one or more processors, further cause the one or more processors to:
receive, from the egress network device, a tunnel encapsulation attribute,
wherein the one or more instructions, that cause the one or more processors to cause the traffic to be provided to the egress network device via the path, cause the one or more processors to:
utilize the tunnel encapsulation attribute to cause the traffic to be provided to the egress network device via an encapsulated tunnel.

* * * * *